(12) United States Patent
Kokubun

(10) Patent No.: US 8,988,529 B2
(45) Date of Patent: Mar. 24, 2015

(54) TARGET TRACKING APPARATUS, IMAGE TRACKING APPARATUS, METHODS OF CONTROLLING OPERATION OF SAME, AND DIGITAL CAMERA

(75) Inventor: Hideaki Kokubun, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 780 days.

(21) Appl. No.: 12/817,571

(22) Filed: Jun. 17, 2010

(65) Prior Publication Data

US 2010/0321505 A1 Dec. 23, 2010

(30) Foreign Application Priority Data

Jun. 18, 2009 (JP) ................................ 2009-145367

(51) Int. Cl.
*H04N 5/225* (2006.01)
*G06T 7/20* (2006.01)
(52) U.S. Cl.
CPC ..... *G06T 7/2006* (2013.01); *G06T 2207/10016* (2013.01); *G06T 2207/20021* (2013.01)
USPC ............ 348/170; 348/169; 348/171; 348/172
(58) Field of Classification Search
USPC ................... 348/170, 234, 155; 382/169, 107
See application file for complete search history.

(56) References Cited

U.S. PATENT DOCUMENTS

| | | | | |
|---|---|---|---|---|
| 5,923,365 A | * | 7/1999 | Tamir et al. | 348/169 |
| 6,130,707 A | * | 10/2000 | Koller et al. | 348/155 |
| 6,323,898 B1 | * | 11/2001 | Koyanagi et al. | 348/169 |
| 2002/0159837 A1 | | 10/2002 | Echigo et al. | |
| 2005/0206726 A1 | * | 9/2005 | Yoshida et al. | 348/143 |
| 2006/0204036 A1 | * | 9/2006 | Huang | 382/103 |
| 2007/0236598 A1 | * | 10/2007 | Kusaka | 348/350 |

FOREIGN PATENT DOCUMENTS

| | | |
|---|---|---|
| JP | 4-281679 A | 10/1992 |
| JP | 5-30406 A | 2/1993 |
| JP | 8-9277 A | 1/1996 |
| JP | 2009-17271 A | 1/2009 |

OTHER PUBLICATIONS

European Search Report issued in corresponding European Patent application No. 10251105.2.

* cited by examiner

*Primary Examiner* — Frederick Bailey
(74) *Attorney, Agent, or Firm* — Birch, Stewart, Kolasch & Birch, LLP

(57) ABSTRACT

A detection area is decided in a case where a target has gone out-of-frame. If a target is being imaged by a camera continuously, it is determined whether the target has gone out-of-frame. If the target has gone out-of-frame, then the magnitude and direction of motion of the camera are detected. If camera motion is large, it can be concluded that the camera user is imaging the target while tracking it. Accordingly, it can be concluded that the target will again be imaged at the center of the imaging zone. An area defined as a region in which the target will be detected is set at the center of the imaging zone. If camera motion is small in a case where the target goes out-of-frame, it can be concluded that the user is waiting for the target to re-enter the imaging zone and therefore the edge of the imaging zone is set as the detection area.

10 Claims, 21 Drawing Sheets

*Fig. 11*

| SUBJECT IMAGE | TARGET COORDINATES (x, y) | TARGET MOTION VECTOR (x, y) | ESTIMATED TARGET-BOX COORDINATES (x, y) | TRACKING STATUS OK/NG |
|---|---|---|---|---|
| SUBJECT IMAGE 60 (FIG. 7) | (627, 240) | (3, 0) | (630, 240) | OK |
| SUBJECT IMAGE 70 (FIG. 9) | (635, 240) | (8, 0) | (643, 240) | OK |
| SUBJECT IMAGE 80 (FIG. 10) | (—, —) | (—, —) | (—, —) | NG |

*Fig. 27*

| SUBJECT IMAGE | CENTER OF TRACKING AREA (x, y) | \|GM\| | \|GM_old\| | \|GM_old\|+th1 | \|GM_old\|+th2 | STATUS |
|---|---|---|---|---|---|---|
| SUBJECT IMAGE 110 | (450, 378) | 3 | — | — | — | — |
| SUBJECT IMAGE 120 | (382, 378) | 90 | 3 | 63 | -57 | MOTION: SMALL → LARGE |
| SUBJECT IMAGE 130 | (378, 378) | 8 | 90 | 150 | 30 | MOTION: LARGE → SMALL |

\* IN CASE OF th1 = 60, th2 = -60

*Fig. 28*

| TRACKING AREA | CENTER OF TRACKING AREA | FEATURE | SELECT |
|---|---|---|---|
| TRACKING AREA 131 | (382, 378) | 0.7 | — |
| TRACKING AREA 132 | (302, 378) | 1.0 | O |

MOTION : SMALL → LARGE

US 8,988,529 B2

TARGET TRACKING APPARATUS, IMAGE TRACKING APPARATUS, METHODS OF CONTROLLING OPERATION OF SAME, AND DIGITAL CAMERA

BACKGROUND OF THE INVENTION

1. Field of the Invention

This invention relates to a target tracking apparatus, an image tracking apparatus, methods of controlling the operation thereof and a digital camera.

2. Description of the Related Art

There are occasions where a target such as a specific person is imaged continuously while being tracked (see the specifications of Japanese Patent Application Laid-Open Nos. 2009-17271, 8-9277 and 4-281679). In such imaging, a detection area is set in the vicinity of the target to be tracked in the imaging zone. The target is detected within the detection area set. When the target is moving, there are instances where it leaves the imaging zone. If a target leaves the imaging zone, where in the imaging zone the detection area should be set in order to track the target can no longer be determined.

Further, when a target is tracked, often a portion of an image having a prescribed feature is regarded as the target (see the specification of Japanese Patent Application Laid-Open No. 5-30406). If the target is moving, however, there are instances where the detected target deviates.

SUMMARY OF TEE INVENTION

An object of the present invention is to arrange it so that a detection area can be set in target tracking.

Another object of the present invention is to prevent deviation of a target that is to be detected.

A target tracking apparatus according to a first aspect of the present invention comprises: a target detecting device (target detecting means) for detecting a target, which is to be tracked, within a detection area of a subject image represented by image data obtained by imaging a subject continuously; a detection area updating device (detection area updating means), responsive to detection of the target by the target detecting device, for updating the detection area in such a manner that the detected target will occupy the center thereof; a motion detecting device (motion detecting means), responsive to the target no longer being detected by the target detecting device, for detecting magnitude and direction of motion of the overall subject image in which the target is no longer detected; a detection area setting device (detection area setting means) for setting the detection area at a central portion of the subject image if the motion of the overall subject image detected by the motion detecting device is equal to or greater than a prescribed magnitude, and setting the detection area at an edge of the subject image in a direction opposite the direction of motion of the subject image, which has been detected by the motion detecting device, if the motion of the overall subject image detected by the motion detecting device is less than the prescribed magnitude; and a control device (control means) for controlling the target detecting device, the detection area updating device, the motion detecting device and the detection area setting device so as to repeat processing for detecting the target, processing for updating the detection area, processing for detecting the magnitude and direction of the motion, and processing for setting the detection area.

The first aspect of the present invention also provides an operation control method suited to the target tracking apparatus described above. Specifically, a method of controlling a target tracking apparatus comprises the steps of: detecting a target, which is to be tracked, within a detection area of a subject image represented by image data obtained by imaging a subject continuously; in response to detection of the target, updating the detection area in such a manner that the detected target will occupy the center thereof; in response to the target no longer being detected, detecting magnitude and direction of motion of the overall subject image in which the target is no longer detected; setting the detection area at a central portion of the subject image if the motion of the overall subject image detected is equal to or greater than a prescribed magnitude, and setting the detection area at an edge portion of the subject image in a direction opposite the detected direction of motion of the subject image if the detected motion of the overall subject image is less than the prescribed magnitude; and repeating processing for detecting the target, processing for updating the detection area, processing for detecting the magnitude and direction of the motion, and processing for setting the detection area.

The first aspect of the present invention also provides a computer-readable program for executing the above-described method of controlling the operation of a target tracking apparatus. The first aspect of the invention may also be adapted so as to provide a recording medium on which this program has been stored.

In accordance with the first aspect of the present invention, a target undergoing tracking is detected in a detection area of a subject image represented by image data representing the image of a subject imaged continuously. If the target is detected, the detection area is updated in such a manner that the target will be located at the center of the area. If the target is not detected, the magnitude and direction of motion of the overall subject image in which the target is no longer detected are detected. If the detected magnitude is equal to or greater than a prescribed magnitude, the detection area is set at the center of the subject image (the imaging zone). If the detected magnitude is less than the prescribed magnitude, then the detection area is set at the edge of the subject image (the edge portion of the imaging zone) in a direction opposite the direction of detected motion of the subject image. Such processing for detecting the target, processing for updating the detection area, processing for detecting motion and processing for setting the detection area is repeated.

If a target is not detected in a case where motion of the overall subject image is large, it is concluded that the target has left the imaging zone despite the fact that the user of the digital camera is following the target positively at the time of imaging. When imaging is performed, it is assumed that the user wishes to capture the target at the center of the imaging zone, and when playback is performed, it assumed that the image data was captured in such a manner that the target will occupy the center of the imaging zone. Accordingly, the detection area is set at the center of the imaging zone (subject image). In a case where the motion of the overall subject image is small, it is concluded that the user of the digital camera is not following the target positively. The detection area, therefore, is set at the edge of the imaging zone (the edge of the subject image) in the direction opposite the direction of motion of the overall subject image.

By way of example, the detection area setting device sets the detection area at a position nearer the central portion of the subject image the larger the magnitude of motion of the overall subject image detected by the motion detecting device, and sets the detection area at a position nearer the edge of the subject image in the direction opposite the direction of motion of the overall subject image the smaller the magnitude of motion of the overall subject image detected by the motion detecting device.

Further, by way of example, the motion detecting device detects the magnitude and direction of motion of the overall subject image based upon amount of deviation between two successive frames of subject images. Further, it may be arranged so that the magnitude and direction of motion of an imaging device are detected by providing a digital camera with an acceleration sensor.

By way of example, the target detecting device assumes that a target has been detected owing to existence in the detection area of a portion having the feature of an image representing a target, or of an image portion identical with a template image representing the target.

An image tracking apparatus according to a second aspect of the present invention comprises: a feature calculating device (feature calculating means) for calculating a feature of an image within a tracking area set in a subject image represented by image data obtained by imaging a subject continuously; a tracked-image detecting device (tracked-image detecting means) for detecting, as a tracked image, an image portion, which has the feature calculated by the feature calculating device, from a subject image captured after the subject image in which the feature was calculated by the feature calculating device; a motion determining device (motion determining means), responsive to detection of the image portion by the tracked-image detecting device, for determining whether motion of the tracked image in the subject image in which the image portion was detected by the tracked-image detecting device has become larger than that for the subject image in which the feature was calculated by the feature calculating device; a storage control device (storage control means), responsive to a determination by the motion determining device that the motion has become larger, for controlling a storage device so as to store the feature calculated by the feature calculating device; a detection control device (detection control means), responsive to a determination by the motion determining device that the motion has become smaller, for controlling the tracked-image detecting device so as to detect the image portion, which has the feature that has been stored in the storage device, from within the subject image in which the image portion was detected by the tracked-image detecting device; a tracking area setting device (tracking area setting means) which, in a case where the motion determining device has determined that the motion has become larger, is for setting the position of the image portion detected by the tracked-image detecting device as the tracking area of the feature calculating device, and in a case where the motion determining device has determined that the motion has become smaller, is for setting, as the tracking area of the feature calculating device, the position of whichever of the following image portions more closely resembles the tracked image: (a) the image portion detected by the tracked-image detecting device under the control of the detection control device and having the feature that has been stored in the storage device, or (b) the image portion detected by the tracked-image detecting device and having the feature calculated by the feature calculating device; and a control device (control means) for controlling the tracked-image detecting device, the motion determining device, the storage control device, the detection control device and the tracking area setting device so as to repeat processing for calculating the feature, processing for detecting the image portion as the tracked image, processing for determining whether the motion has become larger, processing for controlling the storage device, processing for controlling the tracked-image detecting device and processing for setting the image portion as the tracking area.

The second aspect of the present invention also provides an operation control method suited to the image tracking apparatus described above. Specifically, a method of controlling an image tracking apparatus comprises the steps of: calculating a feature of an image within a tracking area set in a subject image represented by image data obtained by imaging a subject continuously; detecting, as a tracked image, an image portion, which has the calculated feature, from a subject image captured after the subject image in which the feature was calculated; in response to detection of the image portion, determining whether motion of the tracked image for the image in which the image portion was detected has become larger than that for the subject image in which the feature was calculated; in response to a determination that the motion has become larger, controlling a storage device so as to store the calculated feature; in response to a determination that the motion has become smaller, executing tracked-image detection processing so as to detect the image portion, which has the feature that has been stored in the storage device, from within the subject image in which the image portion was detected; in a case where it has been determined that the motion has become larger, setting the position of the detected image portion as the tracking area of the feature calculating processing, and in a case where it has been determined that the motion has become smaller, setting, as the tracking area of the feature calculating processing, the position of whichever of the following image portions more closely resembles the tracked image: (a) the image portion detected under the detection control processing and having the feature that has been stored in the storage device, or (b) the image portion that has been detected and has the calculated feature; and repeating processing for calculating the feature, processing for detecting the image portion as the tracked image, processing for determining whether the motion has become larger, processing for controlling the storage device, processing for controlling the tracked-image detection processing and processing for setting the image portion as the tracking area.

The second aspect of the present invention also provides a recording medium storing a computer-readable program for executing the above-described method of controlling the operation of an image tracking apparatus. The first aspect of the invention may also be adapted so as to provide the program.

In accordance with the second aspect of the present invention, the feature of an image within a tracking area set in a subject image obtained by imaging a subject continuously is calculated, and an image portion having the calculated feature is detected as a tracked image from a subject image captured after the subject image in which the feature was calculated. If the tracked image is detected, whether the motion of the subject image has become larger or not is determined. If the motion has become larger, the calculated feature is stored. If the motion has become larger, the position of the tracked image that has been detected is set as the tracking area and is utilized in tracked-image detection processing of the next subject image. If the motion has become smaller, then the image portion having the feature that has been stored in the storage device is detected from the subject image. If the motion has become smaller, then whichever of the following image portions more closely resembles the tracked image is set as the tracking area of the next subject image: (a) the image portion detected by the tracked-image detecting device under the control of the detection control device and having the feature that has been stored in the storage device, or (b) the image portion detected by the tracked-image detecting device and having the feature calculated by the feature calculating device.

If the motion has become smaller, this means that the motion of the subject image of the preceding frame was larger. Hence there are instances where the image portion within the tracking area that was set in the subject image of the preceding frame does not represent the tracked image accurately. Since processing for detecting the image portion is executed utilizing the feature quantity that has been stored in the storage device and the image portion that more closely resembles the tracked image is set as the tracking area of the subject image of the next frame, more accurate image tracking processing can be continued.

By way of example, the motion determining device determines the motion of an imaging device based upon amount of deviation between subject images of two frames captured successively by the imaging device.

By way of example, the tracked-image detecting device detects the tracked image from a feature representing a feature of a template image of the tracked image.

A digital camera (inclusive of a digital still camera, movie video camera, movie/still video camera and digital camera incorporated in a mobile telephone) according to a third aspect of the present invention comprises: an imaging device for continuously imaging a subject and successively outputting image data representing the image of the subject; a target detecting device (target detecting means) for detecting a target, which is to be tracked, in a detection area of the subject image represented by the image data that has been output from the imaging device; a detection area updating device (detection area updating means), responsive to detection of the target by the target detecting device, for updating the detection area in such a manner that the detected target will occupy the center thereof; a motion detecting device (motion detecting means), responsive to the target no longer being detected by the target detecting device, for detecting magnitude and direction of motion of the imaging device; a detection area setting device (detection area setting means) for setting the detection area at a central portion of the subject image if the motion of the imaging device detected by the motion detecting device is equal to or greater than a prescribed magnitude, and setting the detection area at an edge of the subject image in a direction identical with the direction of motion of the imaging device, which has been detected by the motion detecting device, if the motion of the imaging device detected by the motion detecting device is less than the prescribed magnitude; and a control device (control means) for controlling the imaging device, the target detecting device, the detection area updating device, the motion detecting device and the detection area setting device so as to repeat processing for imaging the subject, processing for detecting the target, processing for updating the detection area, processing for detecting the magnitude and direction of the motion, and processing for setting the detection area.

In accordance with the third aspect of the present invention, a subject is imaged continuously and image data representing the image of the subject is output from an imaging device successively. A target undergoing tracking is detected in a detection area of a subject image represented by the image data that has been output from the imaging device. If the target is detected, the detection area is updated in such a manner that the target will be located at the center of the area. If the target is not detected, the magnitude and direction of motion of the imaging device are detected. If the detected magnitude is equal to or greater than a prescribed magnitude, the detection area is set at the center of the subject image (the imaging zone). If the detected magnitude is less than the prescribed magnitude, then the detection area is set at the edge of the subject image (the edge of the imaging zone) in a direction identical with the direction of detected motion of the imaging device. Such imaging processing, processing for detecting the target, processing for updating the detection area, processing for detecting motion and processing for setting the detection area is repeated.

If a target is not detected in a case where motion of the overall subject image is large, it is concluded that the target has left the imaging zone despite the fact that the user of the digital camera is following the target positively at the time of imaging. Since it assumed that the user wishes to capture the target at the center of the imaging zone, the detection area is set at the center of the imaging zone (the center of the subject image). In a case where the motion of the imaging device is small, it is concluded that the cameraman of the digital camera is not following the target positively. The detection area, therefore, is set at the edge of the imaging zone (the edge portion of the subject image) in the direction identical with the direction of motion of the imaging device. The detection area can be set at a position in conformity with the will of the user.

A digital camera (inclusive of a digital still camera, movie video camera, movie/still video camera and digital camera incorporated in a mobile telephone) according to a fourth aspect of the present invention comprises: an imaging device for continuously imaging a subject and successively outputting image data representing the image of the subject; a feature calculating device (feature calculating means) for calculating a feature of an image within a tracking area set in a subject image represented by the image data that has been output from the imaging device; a tracked-image detecting device (tracked-image detecting means) for detecting, as a tracked image, an image portion, which has the feature calculated by the feature calculating device, from a subject image captured after the subject image in which the feature was calculated by the feature calculating device; a motion determining device (motion determining means), responsive to detection of the image portion by the tracked-image detecting device, for determining whether motion of the imaging device or of the tracked image became larger when the subject image in which the image portion was detected by the tracked-image detecting device was captured in comparison with when the subject image in which the feature was calculated by the feature calculating device was captured; a storage control device (storage control means), responsive to a determination by the motion determining device that the motion became larger, for controlling a storage device so as to store the feature calculated by the feature calculating device; a detection control device (detection control means), responsive to a determination by the motion determining device that the motion became smaller, for controlling the tracked-image detecting device so as to detect the image portion, which has the feature that has been stored in the storage device, from within the subject image in which the image portion was detected by the tracked-image detecting device; a tracking area setting device (tracking area setting means) which, in a case where the motion determining device has determined that the motion became larger, is for setting the position of the image portion detected by the tracked-image detecting device as the tracking area of the feature calculating device, and in a case where the motion determining device has determined that the motion became smaller, is for setting, as the tracking area of the feature calculating device, the position of whichever of the following image portions more closely resembles the tracked image: (a) the image portion detected by the tracked-image detecting device under the control of the detection control device and having the feature that has been stored in the storage device, or (b) the image portion detected by the tracked-image detecting device and having the feature calculated by the feature calculating device; and a control device (control means) for controlling the imaging device, the tracked-image detecting device, the motion determining device, the storage control device, the detection control device and the tracking area setting device so as to repeat processing for imaging the subject, processing for calculating the feature, processing for detecting the image portion as the tracked image, processing for determining whether the motion has become larger, processing for controlling the storage device, processing for controlling the tracked-image detecting device and processing for setting the image portion as the tracking area.

In accordance with the fourth aspect of the present invention, a subject is imaged continuously and image data representing the image of the subject is output from an imaging device successively. The feature of an image within a tracking area set in the subject image is calculated, and an image portion having the calculated feature is detected as a tracked image from a subject image captured after the subject image in which the feature was calculated. If the tracked image is detected, whether the motion of the subject image has become larger or not is determined. If the motion has become larger, the calculated feature is stored. If the motion has become larger, the position of the tracked image that has been detected is set as the tracking area and is utilized in tracked-image detection processing of the next subject image. If the motion has become smaller, then the image portion having the feature that has been stored in the storage device is detected from the subject image. If the motion has become smaller, then whichever of the following image portions more closely resembles the tracked image is set as the tracking area of the next subject image: (a) the image portion detected by the tracked-image detecting device under the control of the detection control device and having the feature that has been stored in the storage device, or (b) the image portion detected by the tracked-image detecting device and having the feature calculated by the feature calculating device.

If the motion has become smaller, this means that the motion of the subject image of the preceding frame was larger. Hence there are instances where the image portion within the tracking area that has been set in the subject image of the preceding frame does not represent the tracked image accurately. Since processing for detecting the image portion is executed utilizing the feature quantity that has been stored in the storage device and the image portion that more closely resembles the tracked image is set as the tracking area of the subject image of the next frame, more accurate image tracking processing can be continued.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 illustrates an example of an out-of-frame determination table;

FIG. 27 is an example of a table in which GM (global motion) has been stored in this embodiment;

FIG. 28 is an example of a table in which features are compared in this embodiment;

DESCRIPTION OF THE PREFERRED EMBODIMENTS

Figure 1:
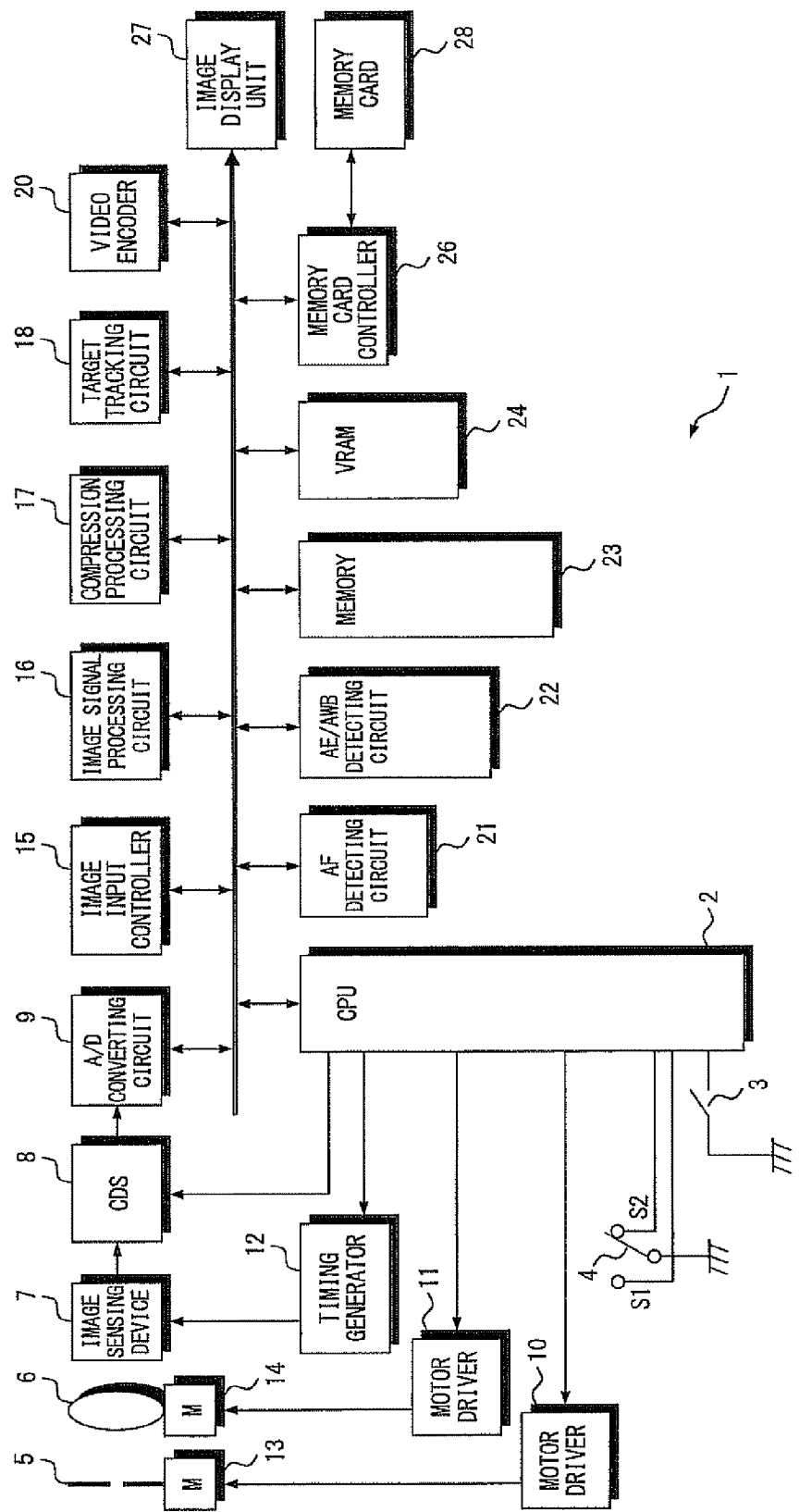
FIG. 1 is a block diagram illustrating the electrical configuration of a digital still camera.

FIG. 1, which illustrates a preferred embodiment of the present invention, is a block diagram illustrating the electrical configuration of a digital still camera 1.

The overall operation of the digital still camera 1 is controlled by a CPU 2.

The digital still camera 1 includes a memory 23 in which an operation program and other data, described later, have been stored. The operation program may be written to a memory card 28 or the like, read out of the memory card 28 and installed in the digital still camera 1, or the operation program may be pre-installed in the camera.

The digital still camera 1 includes a shutter-release button 3 and a mode switch 4. A signal indicating pressing of the shutter-release button 3 is input to the CPU 2. The mode switch 4, which selects the shooting mode or playback mode, is capable of turning on a switch S1 or S2 selectively. The shooting mode is set by turning on the switch S1 and the playback mode by turning on the switch S2.

An iris 5 and a zoom lens 6 are provided in front of a solid-state electronic image sensing device 7 such as a CCD. The iris 5 has its f/stop decided by a motor 13 controlled by a motor driver 10. The zoom lens 6 has its zoom position decided by a motor 14 controlled by a motor driver 11.

If the shooting mode is set by the mode switch 4, light representing the image of a subject that has passed through the iris 5 forms an image on the photoreceptor surface of the image sensing device 7 by the zoom lens 6. The image sensing device 7 is controlled by a timing generator 12 and the image of the subject is captured at a fixed period (a period of 1/30 of a second, by way of example). A video signal representing the image of the subject is output from the image sensing device 7 at a fixed period and is input to a CDS (correlated double sampling) circuit 8. The video signal that has been subjected to correlated double sampling in the CDS circuit 8 is converted to digital image data in an analog/digital converting circuit 9.

The digital image data is input to an image signal processing circuit 16 by an image input controller 15 and is subjected to prescribed signal processing such as a gamma correction. The digital image data is written to a VRAM (video random-access memory) 24, after which this data is read out and applied to an image display unit 27, whereby the image data is displayed as a moving image on the display screen of the image display unit 27. The user of the digital still camera decides the camera angle while viewing the image displayed on the display screen.

In the digital still camera 1 according to this embodiment, a target contained in the image of a subject obtained by imaging can be tracked while the target is surrounded by a box or border. To achieve this, the digital still camera includes a target tracking circuit 18. The camera angle can be decided in such a manner that the target falls within the imaging zone.

The digital image data obtained by image capture is input to an AF (autofocus) detecting circuit 21. The zoom position of the zoom lens 6 is controlled in the AF detecting circuit 21 so as to bring the image of the subject into focus. Further, the digital image data obtained by image capture is input also to an AE (automatic exposure)/AWB (automatic white balance) detecting circuit 22. The AE/AWB detecting circuit 22 decides the aperture of the iris 5 in such a manner that the image of the subject will have an appropriate brightness. A white-balance adjustment is also carried out in the AE/AWB detecting circuit 22.

If the shutter-release button 3 is pressed, image data obtained by image capture is input to a compression processing circuit 17. The image data that has been subjected to prescribed compression processing in the compression processing circuit 17 is input to a video encoder 20 and is encoded thereby. The encoded image data is recorded on the memory card 28 under the control of a memory card controller 26.

If the playback mode is set by the mode switch 4, the image data that has been recorded on the memory card 28 is read. The image represented by the read image data is displayed on the display screen of the image display unit 27.

Figure 2:
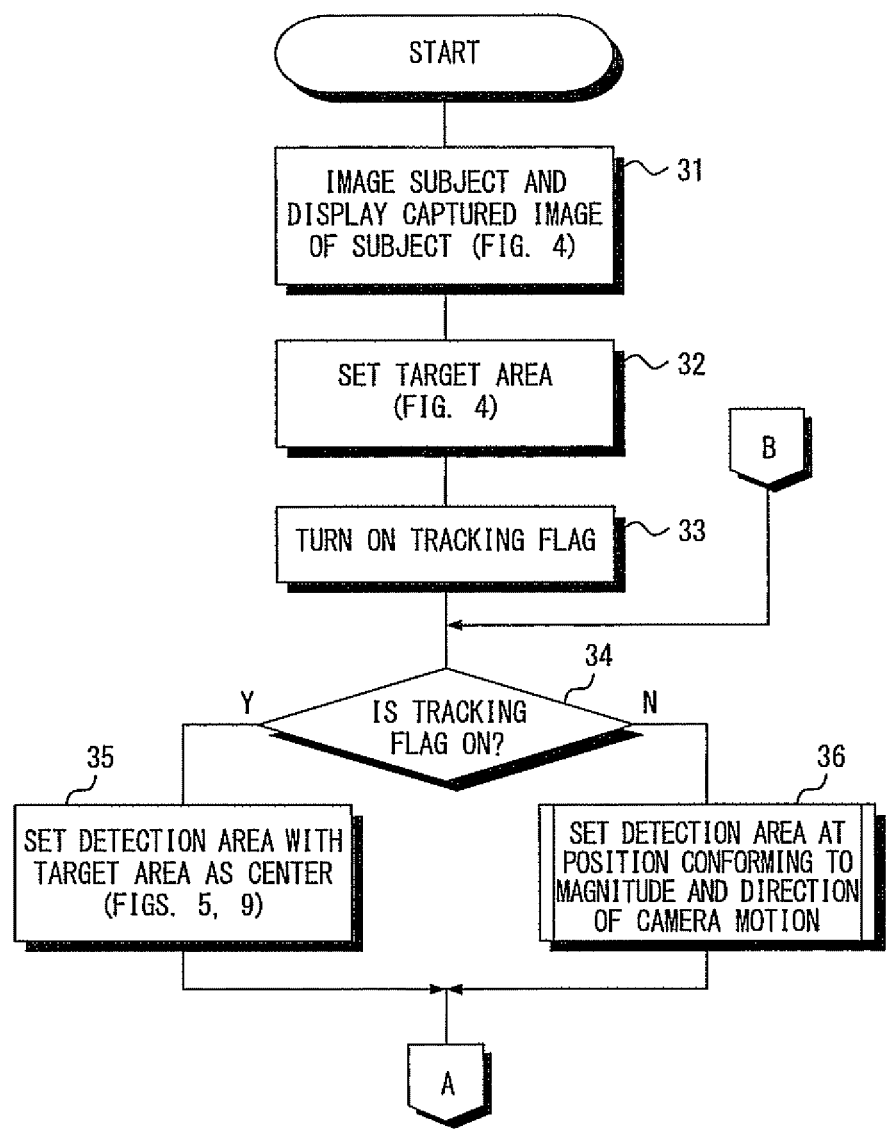
FIGS. 2 and 3 are flowcharts illustrating processing executed by the digital still camera.
Figure 3:
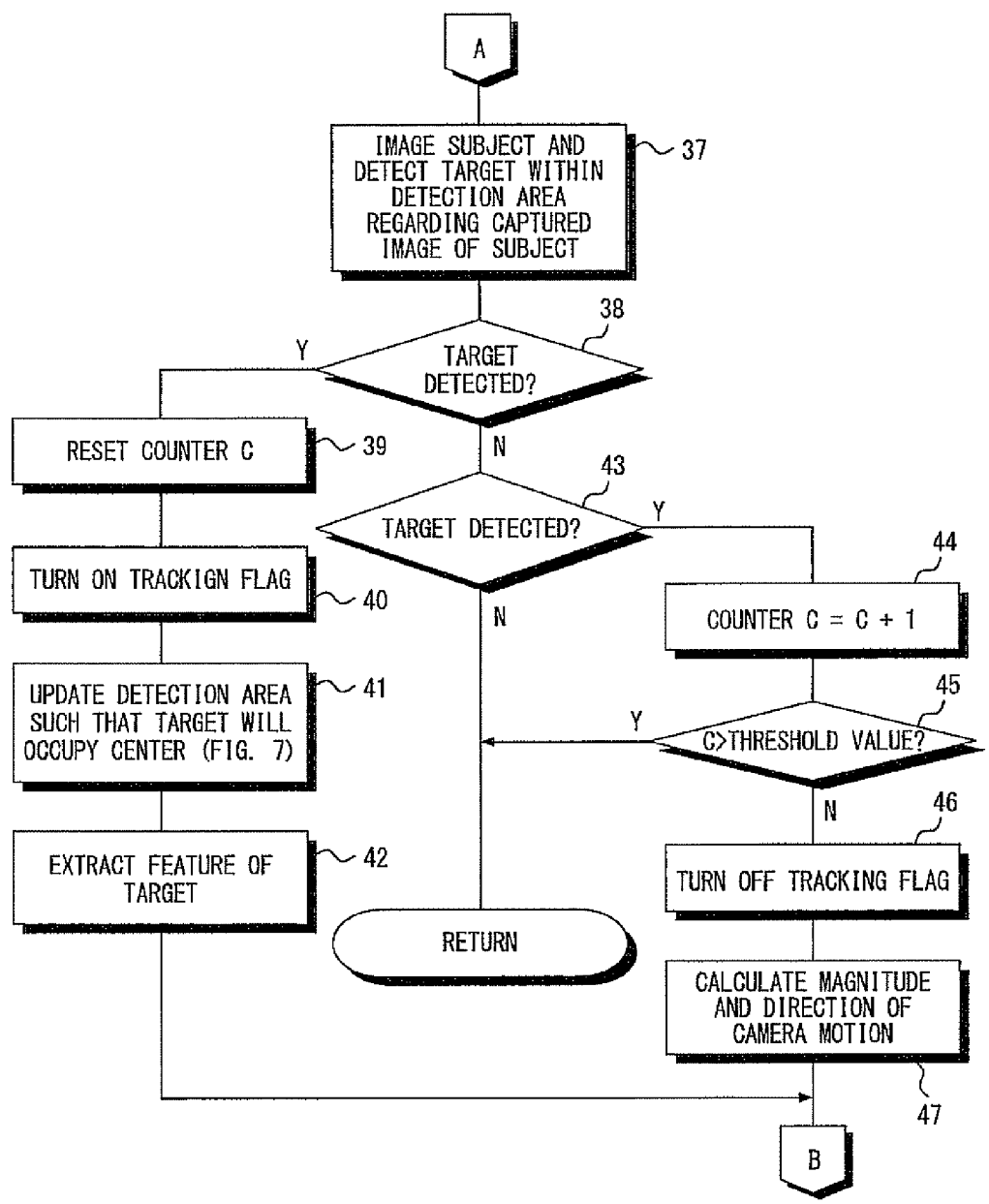

FIGS. 2 and 3 are flowcharts illustrating processing executed by the digital still camera 1. This processing is executed when the digital still camera 1 is set to the shooting mode and a subject is imaged continuously, as described above. The camera angle of the digital still camera 1 is decided by this processing.

In this embodiment, a desired target can be tracked in images of a subject obtained by continuous imaging in the manner described (a box or border can be displayed surrounding the target). The target is not detected from within the entirety of a subject image obtained by imaging but is detected within a detection area in which it is presumed that the target exists. If a target has been detected in a certain frame of the image of a subject, a region corresponding to the detection area the center of which is the position of the detected target is set as the detection area in the next frame of the image of the subject. If a target has not been detected in a certain frame of the image of a subject, then a region corresponding to the detection region is set as the detection area in the next frame of the image of the subject at a central portion or edge portion where it is believed the target will appear in this next frame of the image of the subject. Target detection is performed within the detection area thus set.

A subject is imaged and the image of the subject obtained by such imaging is displayed on the display screen of the display unit 27 (step 31 in FIG. 2). A target area that contains a target to be tracked is set by the user from within the display image of the subject (step 32 in FIG. 2). If a touch-sensitive panel has been formed on the display screen of the display unit 27, then the target area may be set by touching the target. A number of target areas may be displayed on the display screen of the image display unit 27 and a target area may be set by touching it among the target areas or by using a button (not shown). Next, a tracking flag is turned on (step 33 in FIG. 2).

Figure 4:
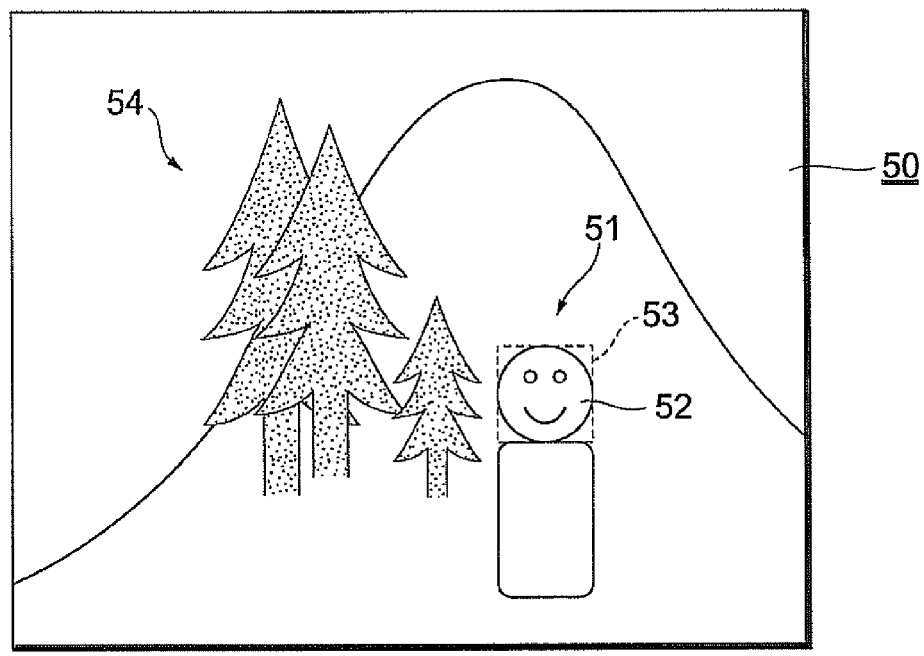
FIGS. 4 to 10 are examples of subject images.

FIG. 4 is an example of the image of a subject obtained by imaging.

A subject image 50 contains an image 51 of a person. A background image 54 is displayed around the person image 51. Assume that a face-image portion 52 of the person image 51 has been set as the target area by the user. If the target area is thus set, a target box (target area) 53 is displayed surrounding the face-image portion 52. It goes without saying that an animal or object, etc., and not just a person may be made a target.

Figure 5:
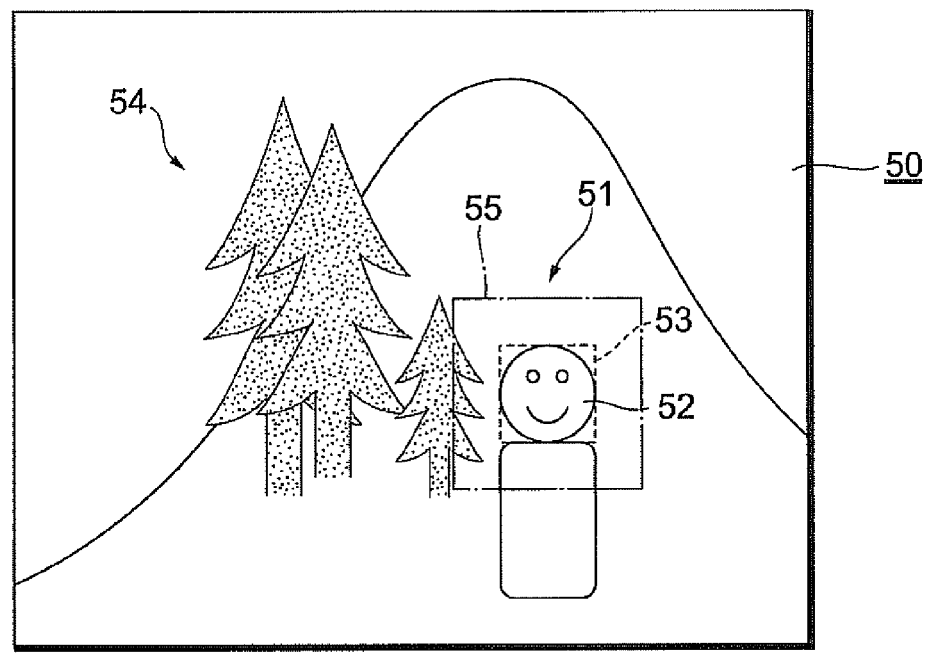

With reference again to FIG. 2, whether or not the tracking flag has been turned on is checked (step 34 in FIG. 2). If the flag has been turned on, this means that the target was detected in the frame preceding the frame in which detection of the target is to be attempted. As illustrated in FIG. 5, therefore, a detection area 55 is set with the target box 53 as its center (step 35 in FIG. 2). The detection area 55 is illustrated in FIG. 5 in order to facilitate understanding. However, it does not matter whether the detection area 55 is or is not displayed on the display screen of the display unit 27. By way of example, the detection area 55 is a rectangular area each side of which is twice the size of the corresponding side of the target box 53.

Figure 6:
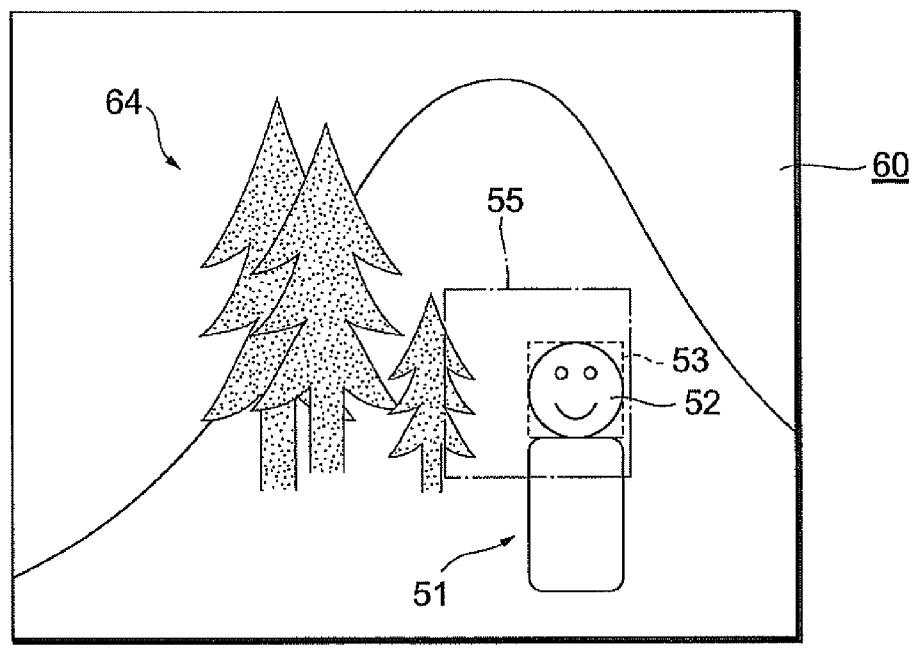

If the subject is imaged again, then a subject image 60 (background image 64) of the next frame is displayed on the display screen of the display unit 27, as illustrated in FIG. 6. In the subject image displayed, target detection processing is executed within an area (let this be the detection area 55) corresponding to the detection area 55 that was set in the subject image 50 of the preceding frame (step 37 in FIG. 3). Utilizing a feature of the target inside the target box 53 (a feature indicating consistency with the target, e.g., a luminance image of the target put into numerical form, or the shape of the target represented by feature points which have been put into numerical form), the target detection processing detects an image portion, the feature of which is equal to or greater than a prescribed threshold value, as the target.

Figure 7:
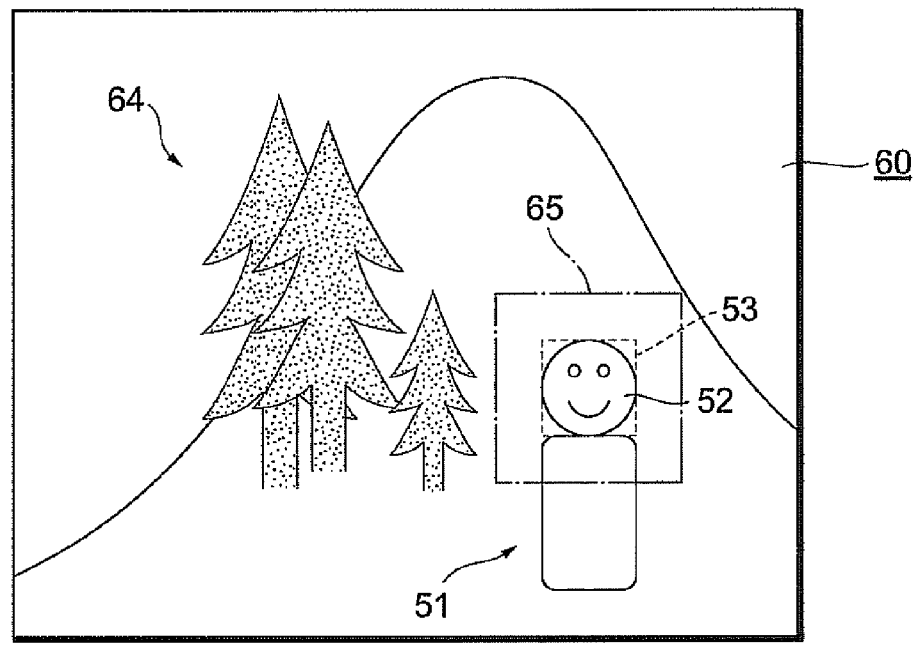

If the target 52 is contained within the detection area 55, as shown in FIG. 6, then the target 52 is detected ("YES" at step 38 in FIG. 3) and a counter is reset (step 39 in FIG. 3). The counter is for halting target tracking processing when, in a case where the target has left the imaging zone, the target fails to fall within the imaging zone a prescribed number of times in succession. The tracking flag is turned on (step 40 in FIG. 3) in response to detection of the target. The detection area 55 is updated in such a manner that the detected target 52 will reside at the center thereof, and an updated detection area 65 is obtained, as illustrated in FIG. 7 (step 41 in FIG. 4). The feature of the target 52 is then extracted (step 42 in FIG. 3).

Figure 8:
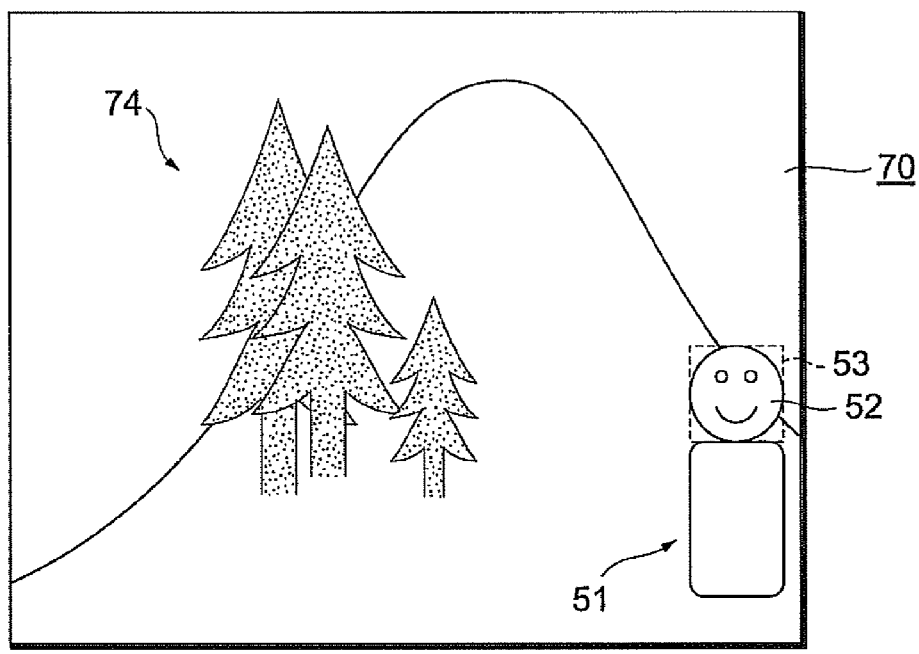
Figure 9:
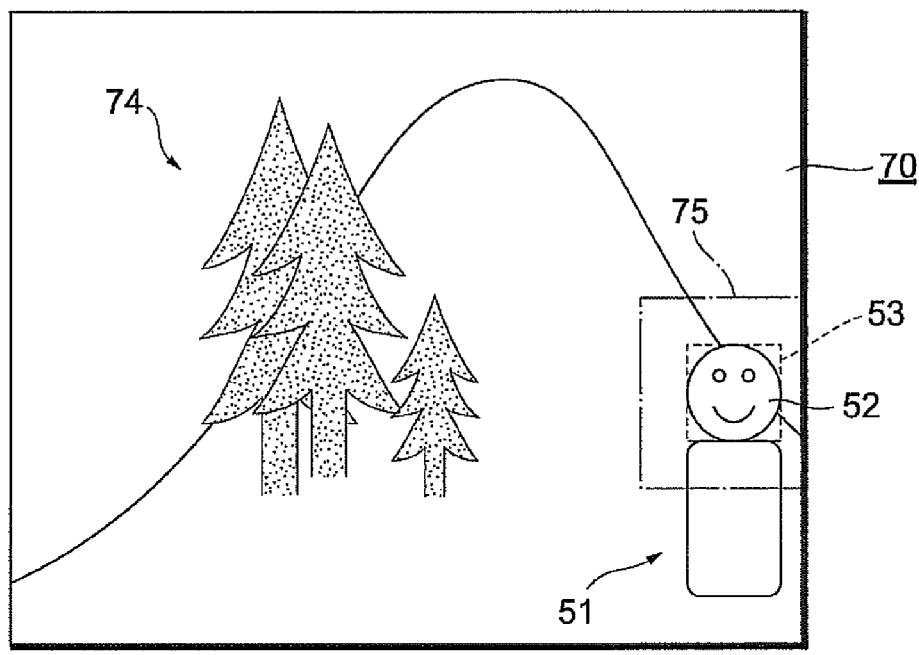

If the next frame is imaged and a subject image 70 obtained, as shown in FIG. 8, a detection area 75 is set, as shown in FIG. 9 in such a manner that target 52 will occupy the center thereof (step 35 in FIG. 2). Target detection is executed within the detection area 75 thus set (step 37 in FIG. 3). Thereafter, if the target 52 is detected, then, in the manner described above, the detection area is set in such a manner that the detected target 52 will occupy the center thereof, and the target is detected from the next frame of the subject image in this detection area.

Figure 10:
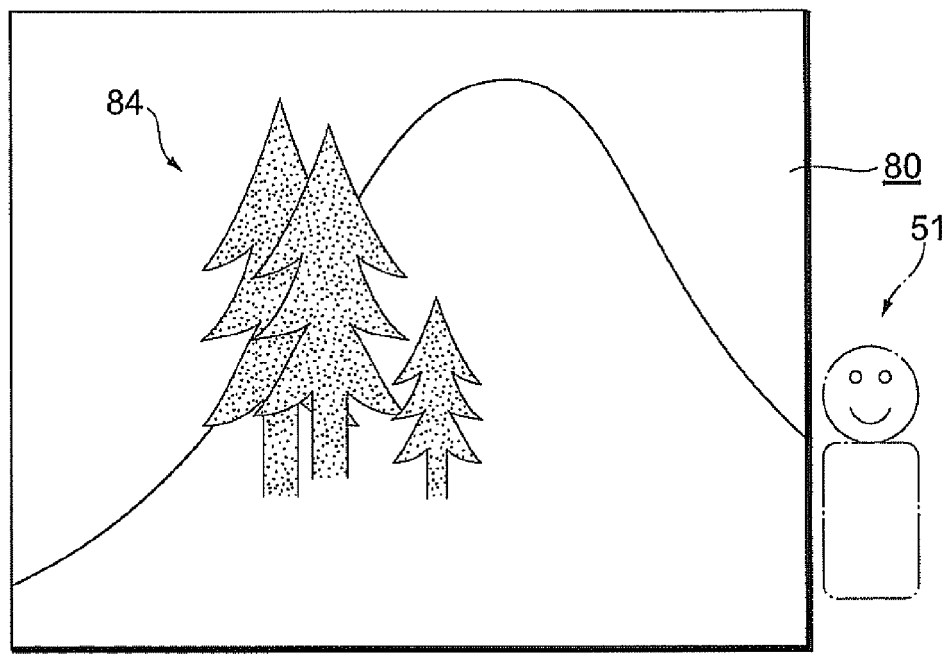

If the person image 51 leaves the subject image 80 (background image 84), as shown in FIG. 10, and the target 52 cannot be detected from the subject image 80 (detection area) ("NO" at step 38 in FIG. 3), then it is determined whether the target 52 has left the imaging zone (i.e., whether out-of-frame has occurred) (step 43 in FIG. 3).

FIG. 11 is an example of a table used in the out-of-frame determination.

The out-of-frame table contains, for every subject image, target-box coordinates, a target motion vector, estimated target-box coordinates and tracking status. In FIG. 11, the table contains data regarding the subject image 60 shown in FIG. 7, the subject image 70 shown in FIG. 9 and the subject image 80 shown in FIG. 10.

Target-box coordinates represent the position of the target box by the coordinates of the center of the target. A target motion vector indicates motion of the target 52 by a vector. A change in coordinates relative to the preceding frame represents a motion vector. Estimated target-box coordinates represent, by the coordinates of the center of the target, coordinates at which it is estimated the target box will exist in the next frame of the subject image. Tracking status indicates whether target tracking has succeeded or not.

A target vector is calculated and the estimated target-box coordinates, which estimate the position of the target box in the next frame, are calculated from the calculated target vector and the target-box coordinates. If the estimated target-box coordinates leave the imaging zone and the target can no longer be tracked, then a determination is made to the effect that out-of-frame has occurred.

With reference again to FIG. 3, the counter is incremented (step 44 in FIG. 3) if it is determined that the target is out-of-frame. If the value in the counter exceeds the threshold value ("YES" at step 45 in FIG. 3), the target tracking processing is terminated. If the value in the counter does not exceed the threshold value ("NO" at step 45 in FIG. 3), then the tracking flag is turned off (step 46 in FIG. 3). Next, the magnitude and direction of camera motion (the magnitude and direction of motion of the overall subject image in which a target could no longer be detected) are detected (step 47 in FIG. 3).

Figure 12:
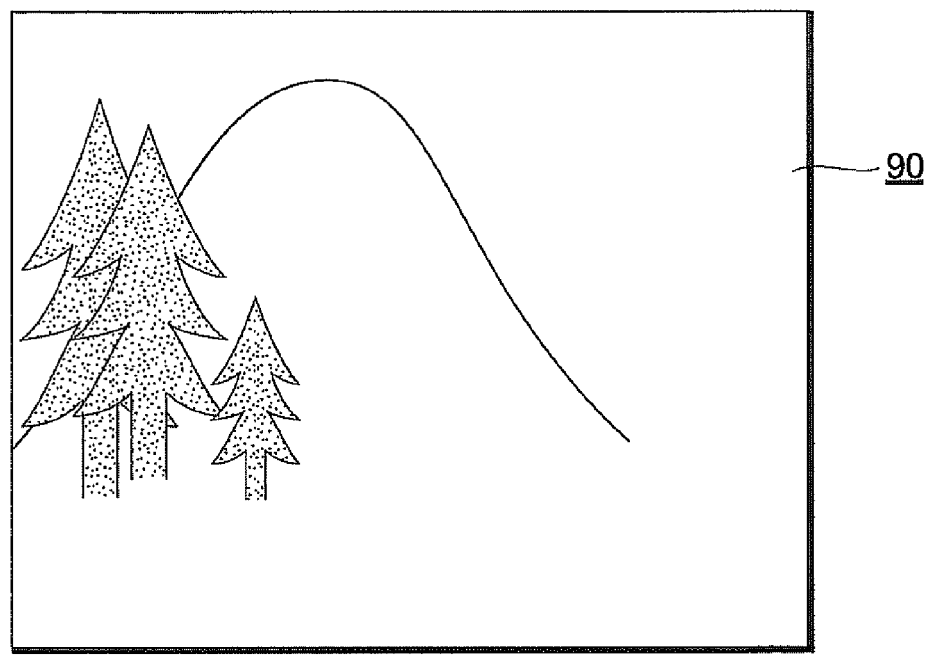
FIGS. 12 to 16 are examples of subject images.

Two frames of subject images are utilized in order to detect the magnitude and direction of camera motion. Specifically, use is made of the subject image 80 in which the target 52 first went out-of-frame, as illustrated in FIG. 10, and a subject image 90 obtained as a result of imaging a subject that follows the subject image 80, as illustrated in FIG. 12. The magnitude and direction of camera motion are detected from the subject images 80 and 90 of these two frames. How detection is carried out will be described in detail later.

When magnitude and direction of camera motion are detected, whether the tracking flag is on is checked (step 34 in FIG. 2). If the target 52 leaves the imaging zone, the tracking flag is turned off ("NO" at step 34) and therefore the detection area is set at a position conforming to the magnitude and direction of camera motion (step 36 in FIG. 2).

Figure 13:
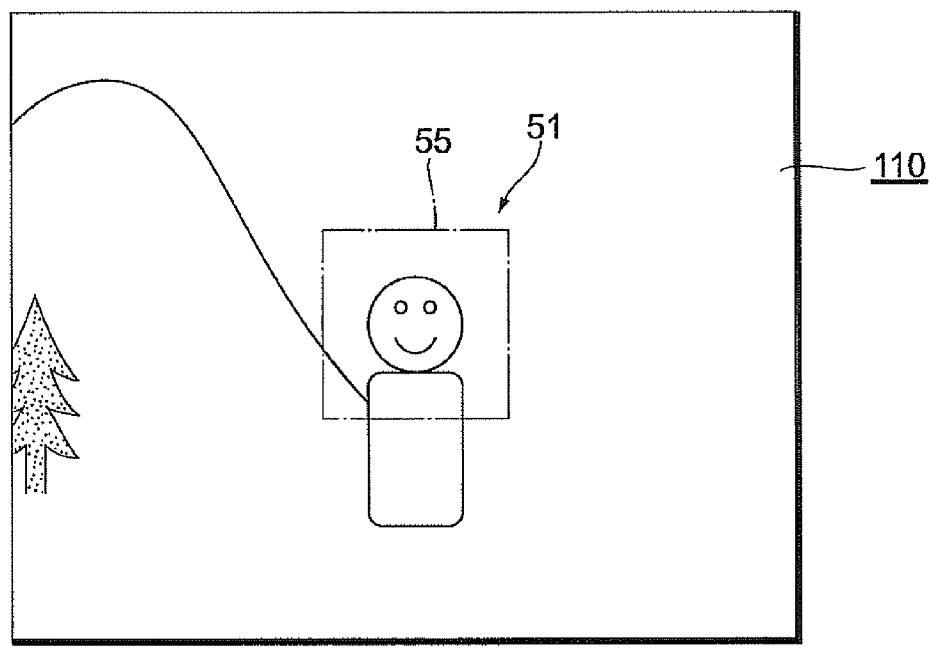

If camera motion is large, it can be concluded that the user of the camera is following the moving target 52 positively (i.e., that the user is moving the camera in such a manner that target 52 is imaged). Therefore, if the target 52 leaves the imaging zone, it can be concluded that the camera will be moved in such a manner that the target 52 will come to occupy the center of the imaging zone. In this embodiment, therefore, if the target 52 leaves the imaging zone in a case where camera motion is large, then the detection area 55 is set so as to occupy the center of the imaging zone, as shown in FIG. 13. If a subject is imaged and a subject image 110 obtained, then processing for detecting the target 52 is executed within the detection area 55 that has been set at the center of the subject image 110 (step 36 in FIG. 2). The detection area 55 in this case is assumed to be a rectangle whose sides are double the size of the sides of the target box, by way of example.

Figure 14:
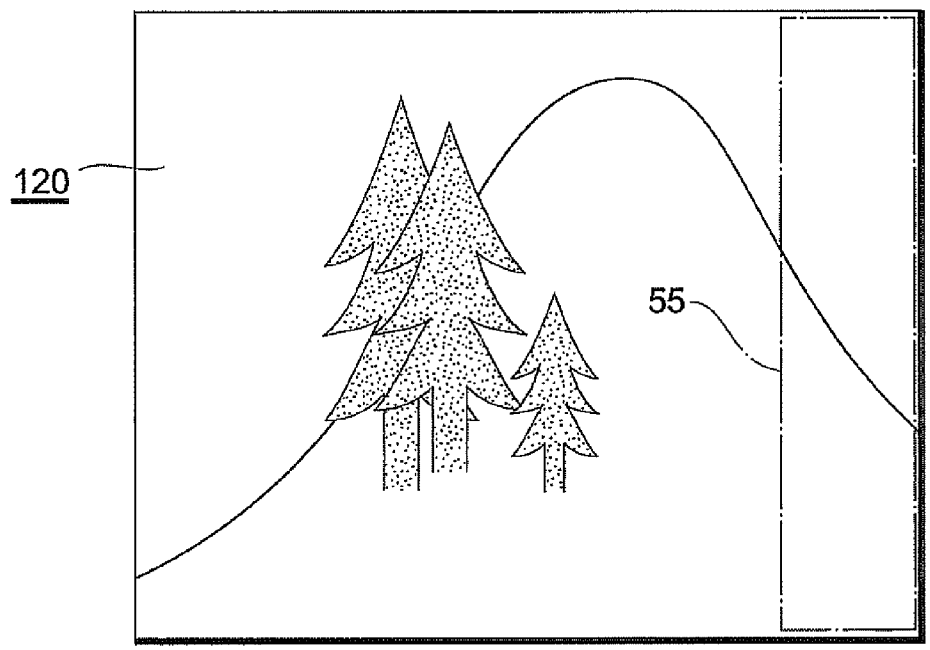
Figure 15:
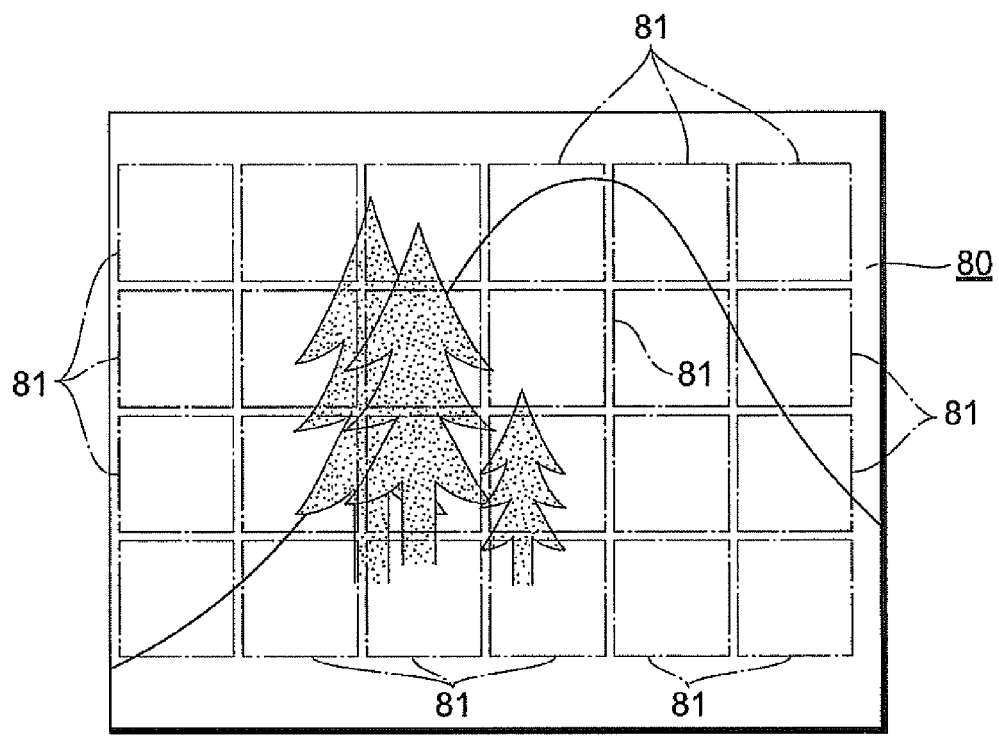

If camera motion is small, it can be concluded that the user of the camera is not following the moving target 52 positively (i.e., that the user is not moving the camera in such a manner that target 52 is imaged). Therefore, if the target 52 leaves the imaging zone in a case where camera motion is small, it can be concluded that the detection area 55 will be set at the edge of the imaging zone in the direction in which the camera is moving (the direction opposite the direction in which the overall subject image is moving), as illustrated in FIG. 14. In FIG. 14, it can be concluded that the camera is moving toward the right side from the vantage point of the user, and the detection area 55 has been set on the right side of the imaging zone. However, it goes without saying that in a case where it is concluded that the camera is moving toward the left side from the vantage point of the user, the detection area 55 will be set on the left side of the imaging zone. Processing for detecting the target 52 is executed in the detection area 55 thus set (step 36 in FIG. 2). The detection area 55 in this case is an area having twice the width of the target box and extending fully from the upper side to the lower side of the imaging zone.

FIGS. 15 to 18 are useful in describing detection of the magnitude and direction of camera motion.

Figure 16:
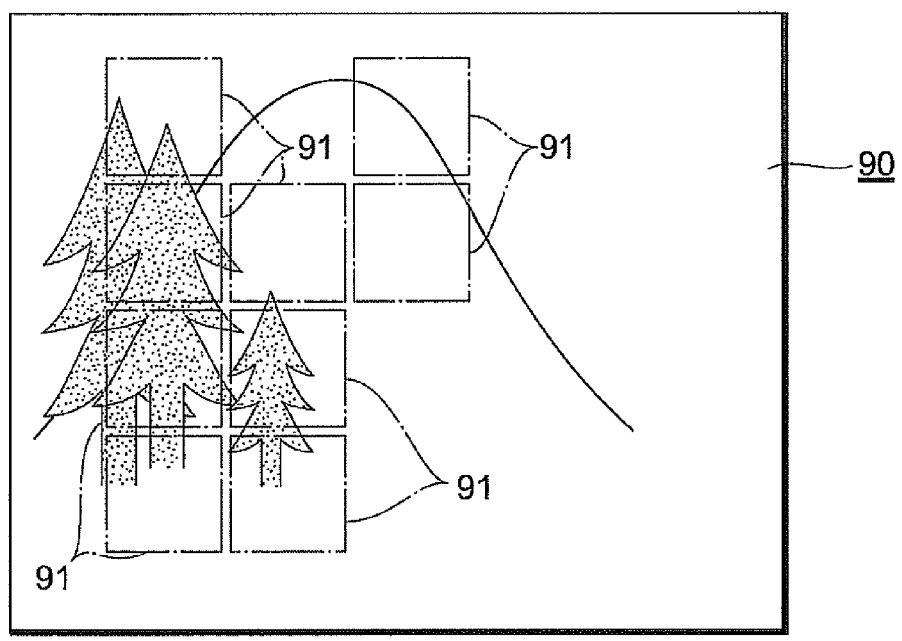
Figure 17:
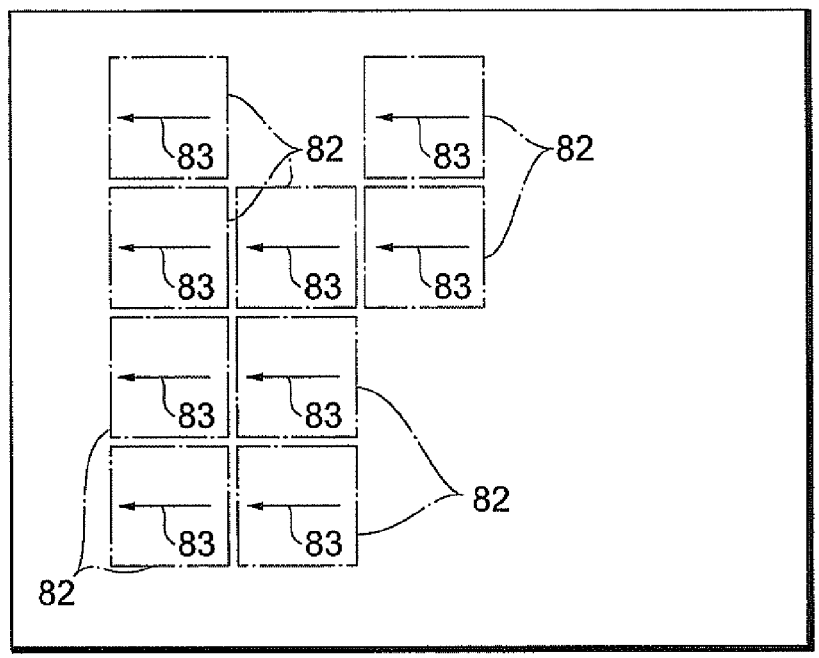
FIG. 17 illustrates motion vectors in sub-regions.

FIGS. 16 and 17 show the subject images 80 and 90 of the two frames obtained when the target goes out-of-frame.

Figure 18:
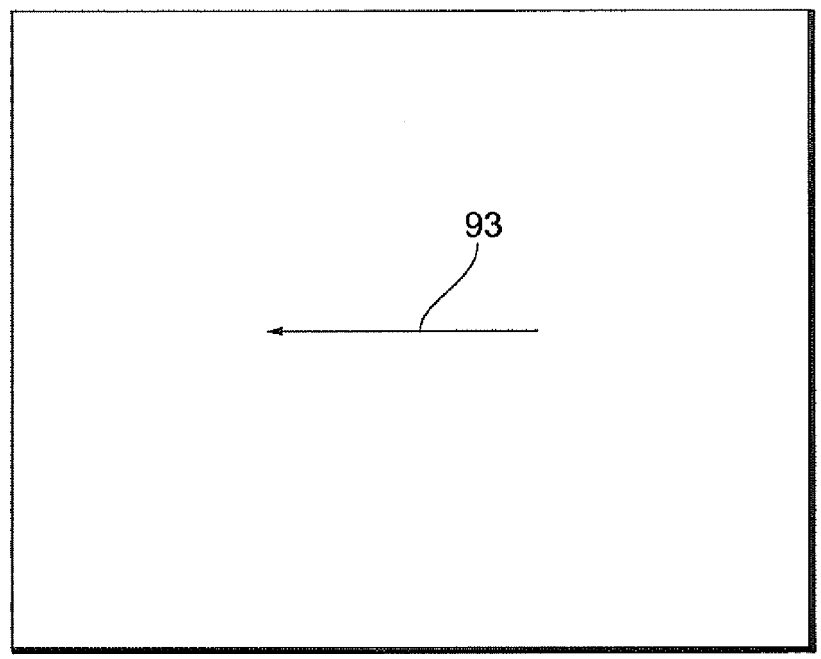
FIG. 18 illustrates a motion vector of a subject image.

A multiplicity of sub-regions 81 are set in the subject image 80. Similarly, a multiplicity of sub-regions 91 having the same size as the size of the sub-regions 81 are set in the subject image 90. A feature is detected for every sub-region 81 that has been set. Sub-regions 91 having features identical with the detected features in the sub-regions 81 are found from among the multiplicity of sub-regions 91 (i.e., sub-region tracking is performed). Processing is executed with regard to all of the sub-regions 81 in order to find sub-regions 91 having the same features. Sub-regions 82 (see FIG. 17) corresponding to the sub-regions 91 that have been found are set aside from the multiplicity of sub-regions 81. These sub-regions 82 that have been set aside are those for which tracking of the sub-regions 81 has succeeded. From these set-aside sub-regions 82, motion vectors 83 of the respective areas are calculated. An average vector 93 is calculated from all of the motion vectors 83 that have been calculated, as shown in FIG. 18. The calculated average vector 93 indicates the magnitude and direction of camera motion (the magnitude and direction of motion of the overall subject image in which the target could no longer be detected).

Figure 19:
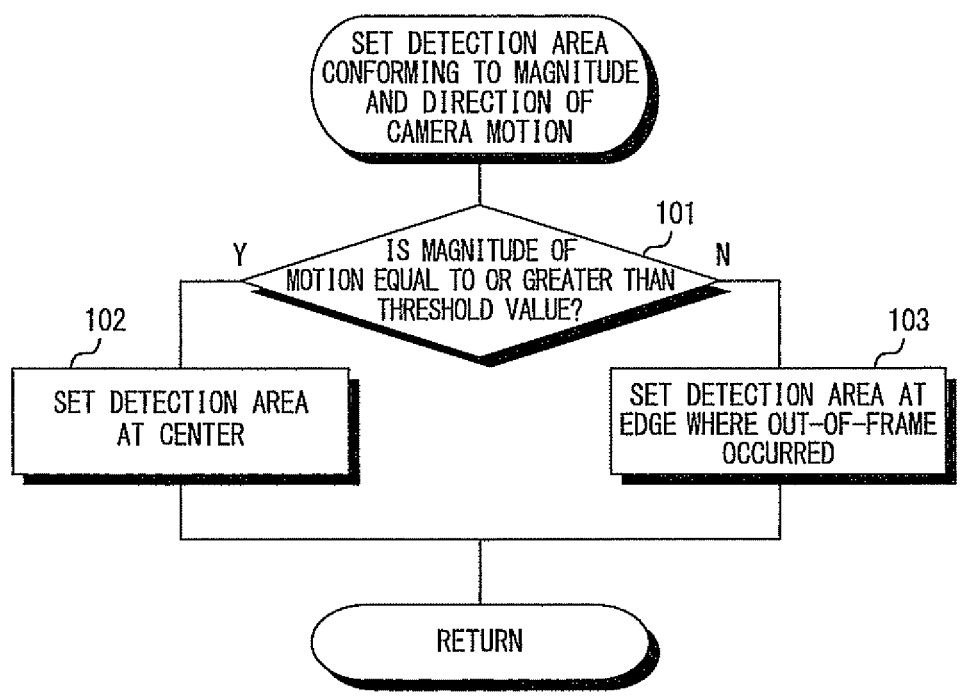
FIG. 19 is a flowchart illustrating processing for setting a detection area.

FIG. 19 is a flowchart illustrating processing for setting a detection area at a position conforming to the magnitude and direction of camera motion.

A check is made to determine whether the magnitude of camera motion detected as described above is equal to or greater than a prescribed threshold value (step 101).

If the magnitude of camera motion is equal to or greater than the prescribed threshold value ("YES" at step 101), it is construed that the user of the camera is imaging the target while following it, as described above. The detection area, therefore, is set at the center of the imaging zone (step 102). If the magnitude of camera motion is less than the prescribed threshold value ("NO" at step 101), then it can be concluded that the user of the camera, rather than imaging the target while following it, is waiting for the target to re-enter the imaging zone. Accordingly, the detection area is set at the edge of the imaging zone in the direction of movement of the camera (step 103).

FIGS. 20 to 32 illustrate another embodiment of the present invention. This embodiment also is applicable to the digital still camera having the block diagram shown in FIG. 1.

Figure 20:
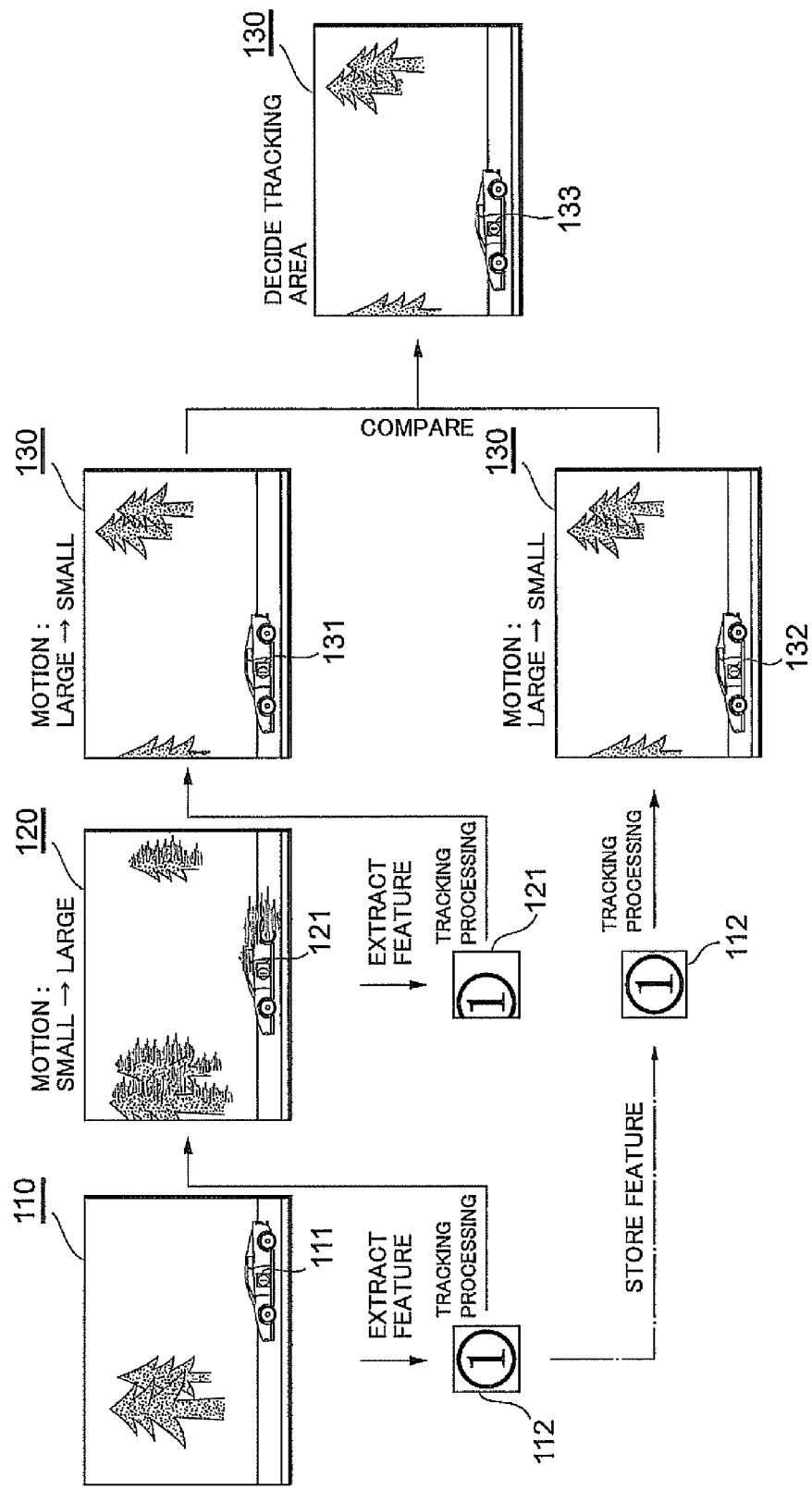
FIG. 20 illustrates an overview of another embodiment.

FIG. 20 illustrates an overview of this embodiment.

In a manner similar to that of the first embodiment, a subject is imaged and a subject image 110 is obtained. A tracking area 111 has been set in the subject image 110, and a feature 112 of a target within the tracking area 111 is extracted. The extracted feature 112 is stored.

In a subject image 120 obtained next by imaging, an area 121 of an image portion (tracked image) having the extracted feature 112 is set as a tracking area 121. In a further subject image 130 obtained next by imaging, an area 131 of an image portion having the feature 121 within the tracking area 121 that was detected in the subject image 120 of the preceding frame is set as a tracking area 131.

Assume that when the subject image changed from subject image 120 to subject image 130, the motion of the subject slowed down. In this case, since the subject image 120 is blurry, the feature 121 of the target extracted from the subject image 120 may not represent the feature of the target accurately. For this reason, a tracking area 132 is set based upon the subject image 130 using the stored feature 112 (it is assumed that this feature has been obtained from the subject image 110 the motion of which is smaller than that of the subject image 120).

The image within the tracking area 131 set using the feature 121 extracted from the subject image 120 of the preceding frame and the image within the tracking area 132 set using the stored feature 112 are compared and whichever of the tracking areas 131, 132 represents an image that more closely resembles the target (the image portion that more closely resembles the image portion that is to be tracked) is set as a tracking area 133 of the subject image 130. If, in a case where the target is moving, the motion becomes smaller than it was for the subject image of the preceding frame, then processing for detecting the target using the feature extracted from the subject image of the preceding frame and processing for detecting the target using the feature extracted from the subject image and stored when the target motion is small is executed and the area representing the image that more closely resembles the target is decided upon as the tracking area.

The details of this operation will be come clear from the description that follows.

Figure 21:
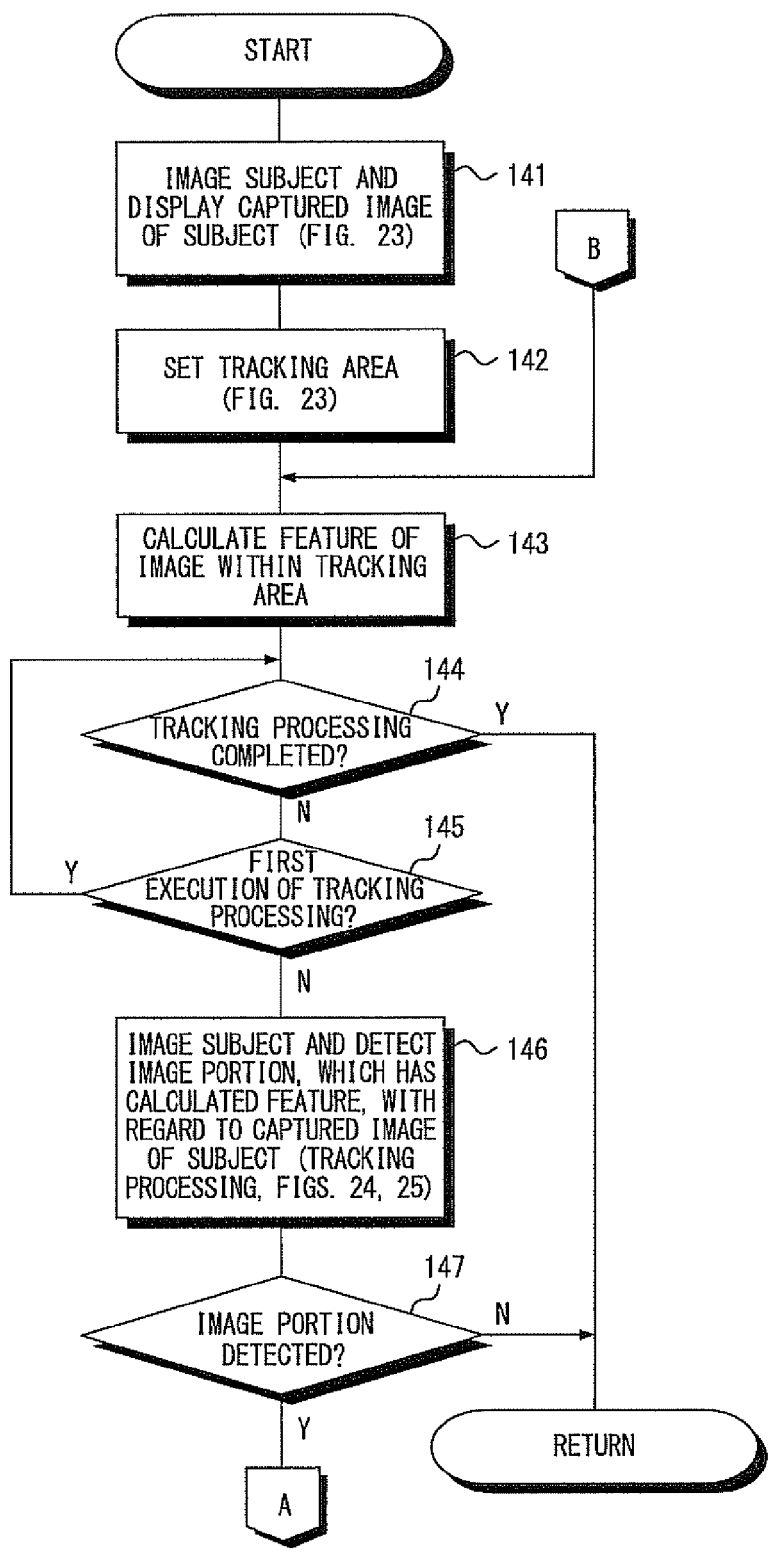
FIGS. 21 and 22 are flowcharts illustrating processing executed by a digital still camera according to this embodiment.
Figure 22:
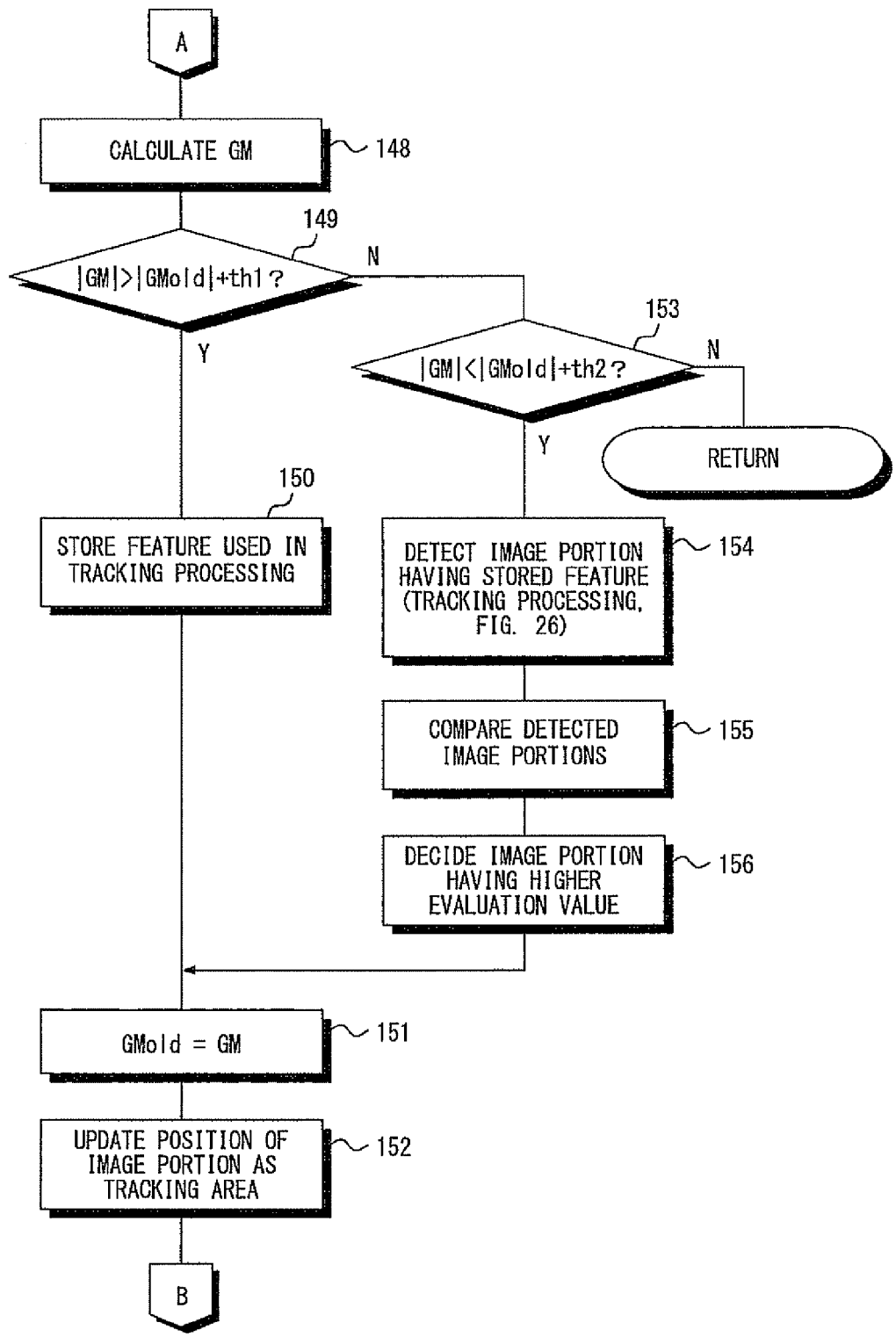

FIGS. 21 and 22 are flowcharts illustrating processing executed by the digital still camera according to this embodiment. FIGS. 23 to 26 are examples of subject images obtained by imaging.

Figure 23:
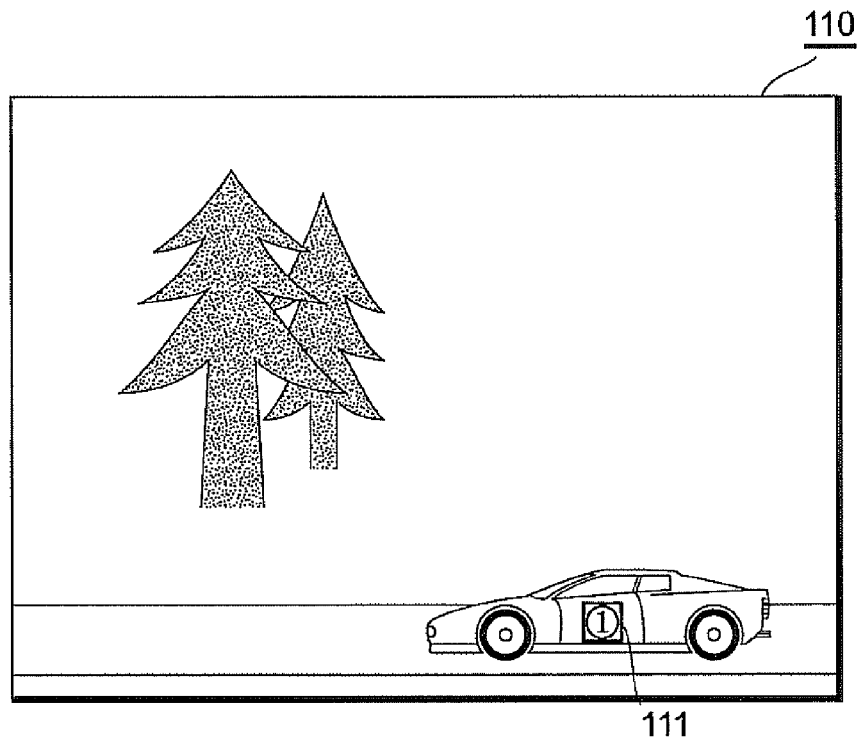
FIGS. 23 to 26 are examples of subject images in this embodiment.

The subject image 110 shown in FIG. 23 is obtained by imaging the subject. The subject image 110 obtained is displayed on the display screen of the display unit 27 (step 141 in FIG. 21). The target is set by the user and the box (target area) 111 surrounding the target is displayed (step 142 in FIG. 21). The feature of the image within the tracking area 111 is calculated (step 143 in FIG. 21).

If tracking processing has not ended ("NO" at step 144 in FIG. 21), then whether this is the first instance of tracking processing is checked (step 145 in FIG. 21). If this is the first time ("YES" at step 145 in FIG. 21), then there will be only one frame of a subject image and, as a consequence, tracking processing cannot be executed utilizing an image within a tracking area that was set in a subject image captured previously. Accordingly, the next frame is captured and then tracking processing is executed ("NO" at step 145 in FIG. 21).

Figure 24:
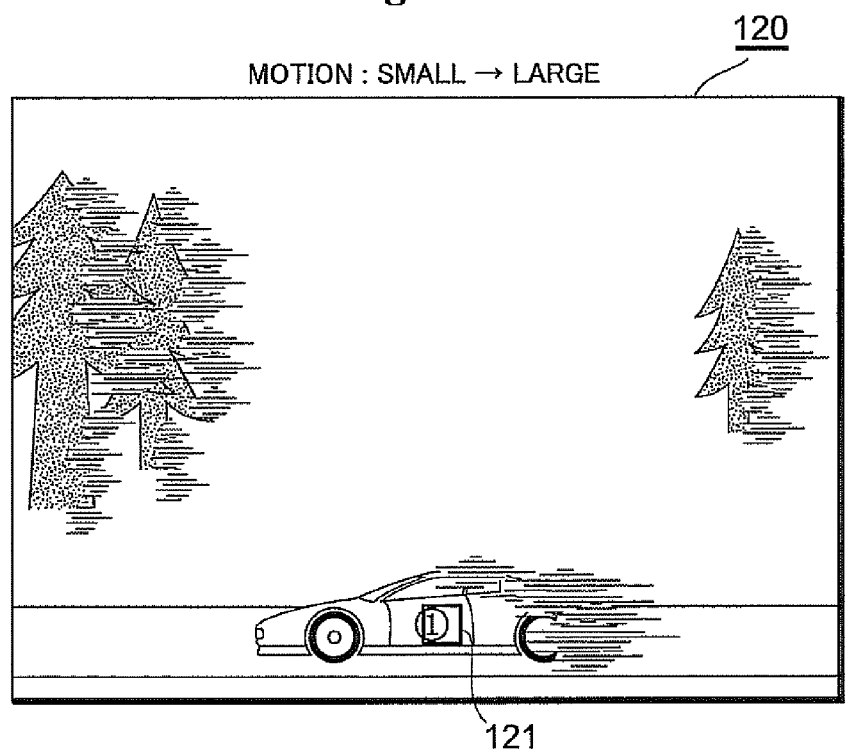

The subject is imaged again and the subject image 120 shown in FIG. 24 is obtained (step 146). From the subject image 120 obtained, an image portion (tracked image portion) having the feature of the image within the tracking area 111 that was set in the subject image 110 of the preceding frame is detected (step 146 in FIG. 21). When the image portion is detected ("YES" at step 147 in FIG. 21), a value referred to as "global motion" (GM) is calculated in order to check whether motion of the subject slowed down when the subject image changed from the subject image 110 to the subject image 120, as mentioned above (step 148 in FIG. 22).

Let GMold represent the GM of the subject image of the preceding frame, and let GM represent the GM of the subject image of frame that follows the subject image of the preceding frame. If |GM|>|GMold|+th1 holds, a determination is made to the effect that the motion of the overall subject image changed from small motion to large motion. If |GM|>|GMold|+th1 does not hold but |GM|<|GMold|+th2 holds, then it is determined that the motion of the overall subject image changed from large motion to small motion.

If |GM|>|GMold|+th1 holds ("YES" at step 149 in FIG. 21), then the image feature of the image within the tracking area 111 of subject image 110 that prevailed when motion was small is stored (step 150 in FIG. 22), as described above. Further, GMold is updated to the new GM (step 151 in FIG. 21). Furthermore, the position of the detected image portion is updated as the new tracking area 121 (step 152 in FIG. 22). A feature is calculated from the image within the updated tracking area 121 in order to be utilized in the next frame of target detection (step 143 in FIG. 21).

Figure 25:
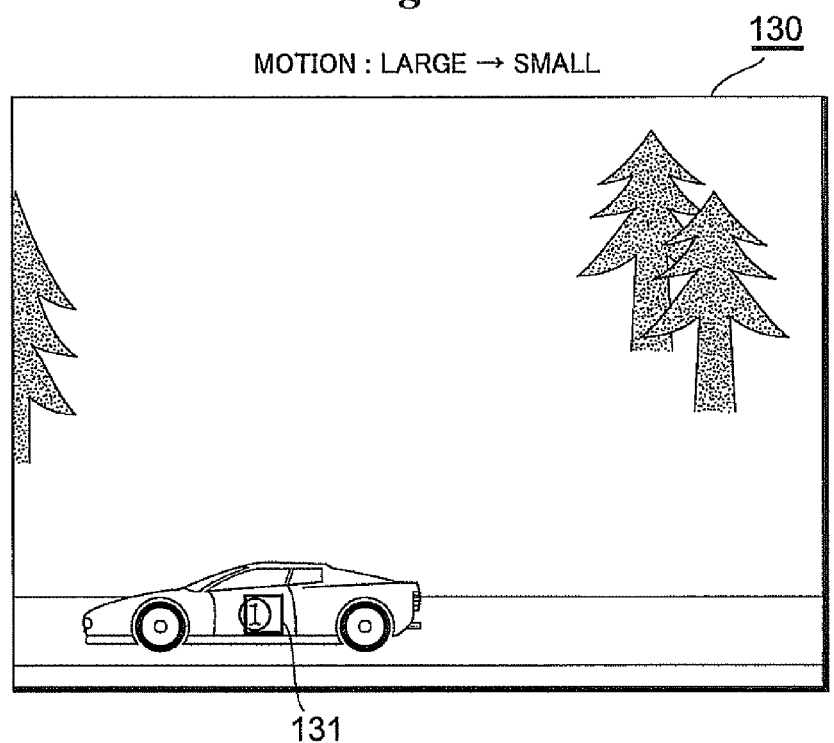

Assume that the subject image 130 shown in FIG. 25 is obtained by the next image capture. With regard to the subject image 130, assume that the image portion having the feature calculated from the image within the updated tracking area 121 is detected and that the tracking area 131 is obtained (step 146 in FIG. 21). In order to calculate the change in magnitude of motion between the motion of the subject image 130 and the motion of the subject image 120 in the frame preceding the subject image 130, GM is calculated again in the manner described above (step 148 in FIG. 22).

Figure 26:
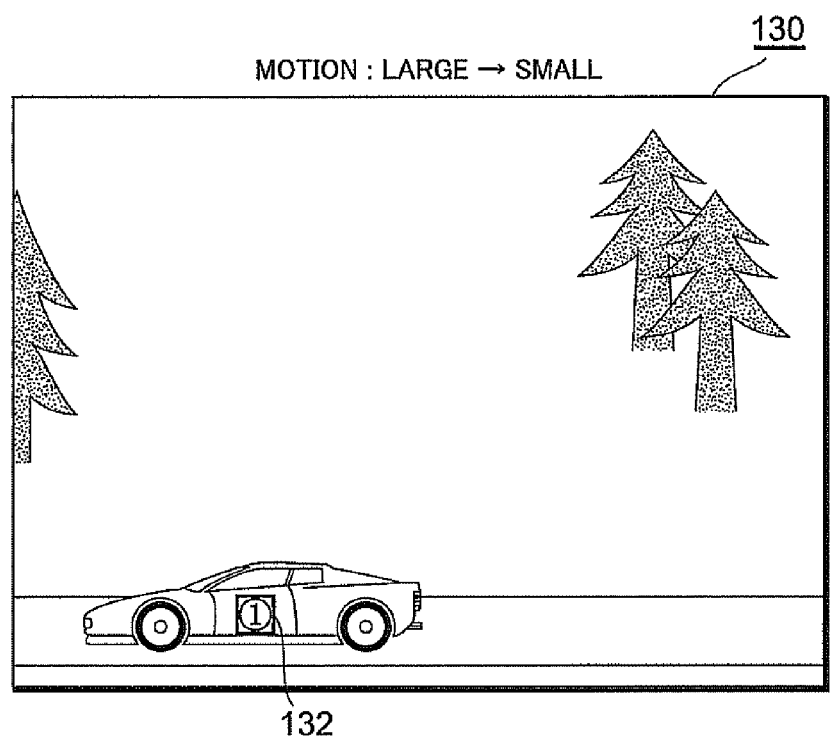

If |GM|>|GMold|+th1 does not hold but |GM|<|GMold|+th2 holds ("YES" at step 153 in FIG. 22), this means that motion of the subject changed from large to small. In this case, use is made of the feature of the target obtained and stored when the motion of the subject was small and the image portion having this feature is detected (step 154 in FIG. 22). As a result, the tracking area 132 representing the image portion detected as shown in FIG. 26 is obtained from the subject image 130.

Next, a comparison is made between (a) the image portion within the tracking area 131 (FIG. 25), which was obtained from the feature calculated from the image within the tracking area 121 set in the subject image 120 of the preceding frame obtained when the motion of the subject was large, and (b) the image portion within the tracking area 132 (FIG. 26), which was obtained from the feature stored upon being calculated from the image within the tracking area 111 set in the subject image 110 obtained when the motion of the subject was small (step 155 in FIG. 22). From the result of the comparison, the image portion having the higher evaluation value is decided upon as representing the target (step 156 in FIG. 22). Specifically, the features of the two image portions compared would be calculated and the image portion having the higher feature value would be decided upon as the image portion having the higher evaluation value.

If, in a case where a target is detected, the feature of the image portion detected from the subject image of large motion would come to be utilized, use would be made of the feature of the image portion detected from the subject image captured previously and exhibiting little motion. This makes it possible to prevent diminished target detection ascribable to blurring of the subject image.

FIG. 27 is an example of a table for evaluating a change in magnitude of motion.

A change in the magnitude of motion is decided based upon GM, as mentioned above. In this table, target area represents the center coordinates of the target area; |GM| is the GM of the particular subject image; and |GMold|, |GMold|+th1 and |GMold|+th2 represent the values used in the above-mentioned expressions in regard to the particular subject image. Status indicates a change in motion. This table indicates a case where th1=60, th2=−60 holds. By applying these to the above-mentioned expressions, it can be understood that motion of the subject image 120 changed from small to large and that motion of the subject image 130 changed from large to small.

FIG. 28 is a table illustrating the feature of the image within the tracking area 131 of subject image 130 shown in FIG. 25 and the feature of the image within the tracking area 132 of subject image 130 shown in FIG. 26.

The feature of the image portion within the tracking area 132 is greater than the feature of the image portion within the tracking area 131. The area 132, therefore, is selected as the tracking area.

FIGS. 29 to 32 illustrate a modification.

Figure 29:
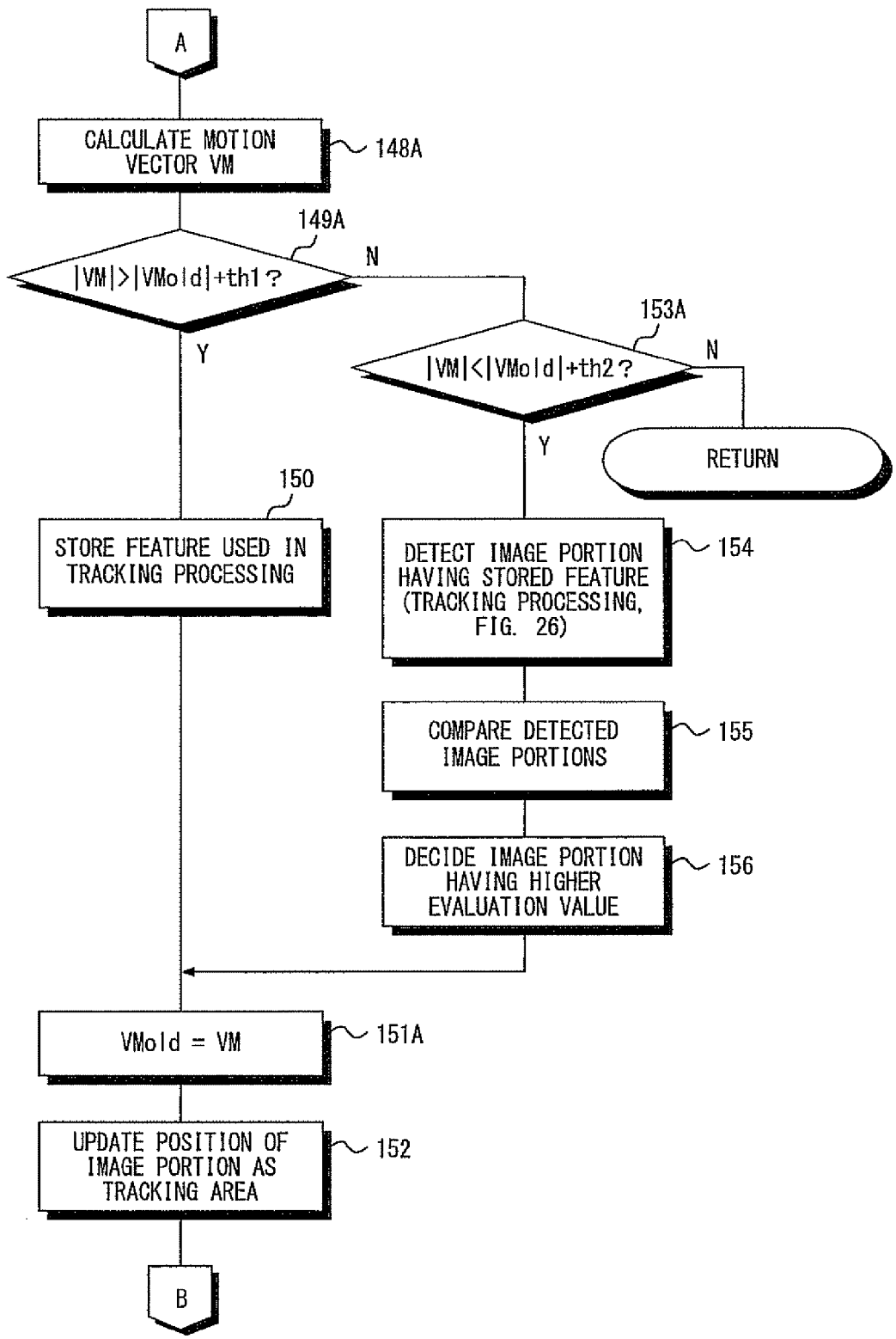
FIG. 29 is a flowchart illustrating processing executed by a digital still camera according to a modification.
Figure 30:
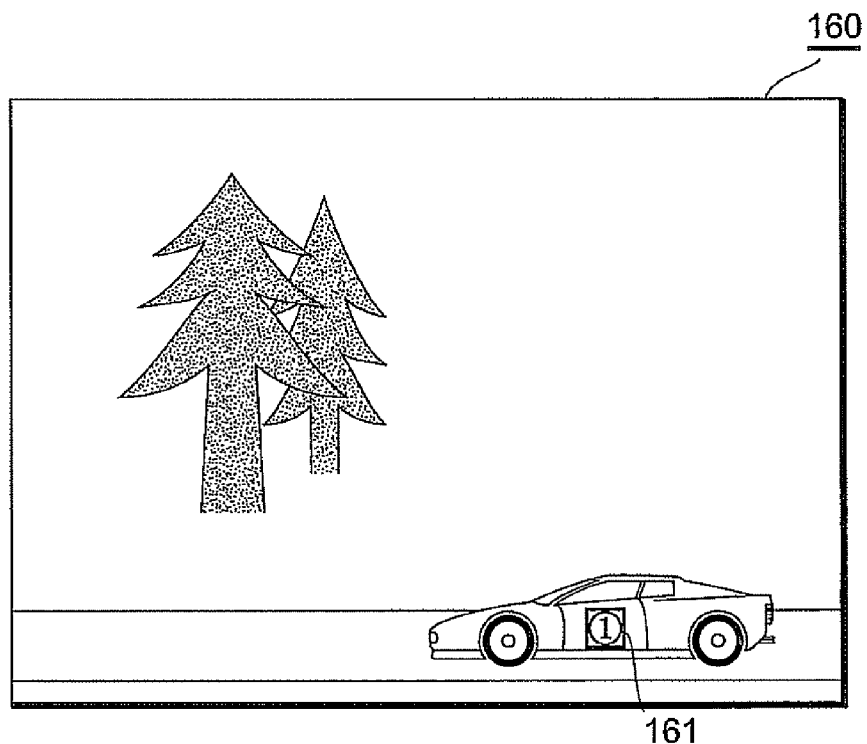
FIGS. 30 to 32 are examples of subject images according to the modification.
Figure 31:
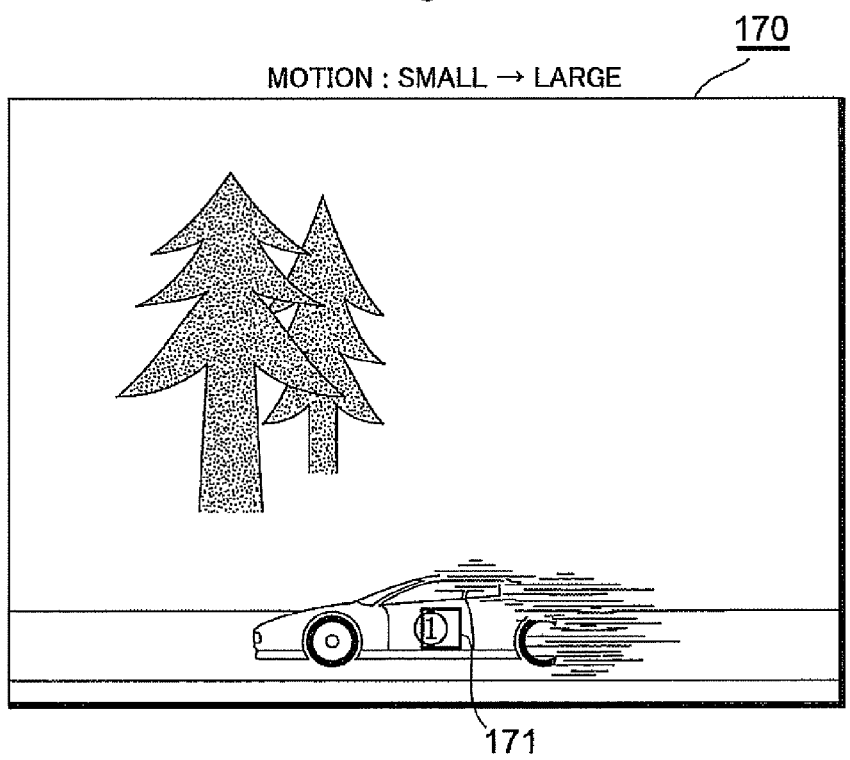
Figure 32:
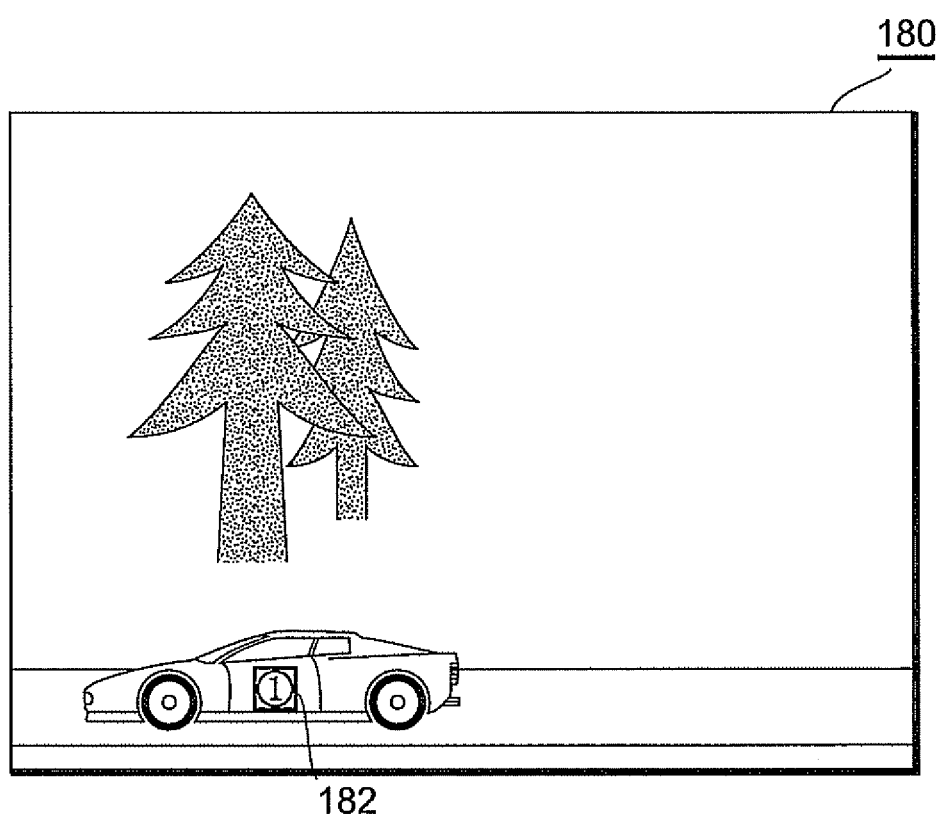

FIG. 29 is a flowchart illustrating a portion of processing executed by a digital still camera and corresponds to FIG. 22. Processing steps in FIG. 29 identical with those shown FIG. 22 are designated by like step numbers and need not be described again. FIGS. 30 to 32 are examples of subject images.

In the embodiment described above, processing is changed in dependence upon the magnitude of motion of the overall subject image. In this modification, however, processing is changed in dependence upon the magnitude of motion of the target rather than magnitude of motion of the overall subject image.

As shown in FIG. 30, an image portion of the feature of a target that has already been set is detected from a subject image 160 obtained by imaging, and a tracking area 161 is set. The feature of the image within the set tracking area 161 is stored in a manner similar to that described above.

As shown in FIG. 31, target detection processing is executed with regard to a subject image 170 imaged next, and a tracking area 171 is detected. A motion vector VM regarding the image within the tracking area 161 and a motion vector VM regarding the image within the tracking area 171 are calculated. If |VM|>|VMold|+th1 holds ("YES" at step 149A), a determination is made to the effect that motion of the target in a subject image 170 of the next frame is larger than motion of the target in the subject image 160 of the preceding frame. The feature of the image within the tracking area 161 that was set in the subject image 160 of the preceding frame is stored (step 150).

As illustrated in FIG. 32, a subject image 180 of the next frame is obtained by imaging. If |VM|<|VMold|+th2 holds ("YES" at step 153A), it is construed that motion of the subject image 180 of the next frame is smaller than motion of the subject image 170 of the preceding frame, in the manner described above. Since the image within the tracking area 171 set in the subject image 170 of the preceding frame is construed to be more blurry, the image portion having the higher evaluation value is decided upon between either the image within a tracking area 182 set using the image within the tracking area 171 set in the subject image 170 of the preceding frame or the stored image within the tracking area 161 of the subject image 160 of the preceding frame, and the tracking area is set in the manner described above.

The invention according to this embodiment is applicable to not only a digital still camera but also to a digital movie camera, movie/still video camera and digital camera incorporated in a mobile telephone. Further, the invention is applicable not only when capturing an image but also to a moving-image playback apparatus that reproduces image data obtained by shooting a subject continuously. For example, the invention is applicable in cases where a target or the like is tracked during moving-image playback and the moving image is subject to trimming, enlarging or reducing processing in such a manner that an appropriate composition for the target is obtained.

As many apparently widely different embodiments of the present invention can be made without departing from the spirit and scope thereof, it is to be understood that the invention is not limited to the specific embodiments thereof except as defined in the appended claims.

What is claimed is:

1. A target tracking apparatus comprising:
   a target detecting device for detecting a target, which is to be tracked, within a detection area of a subject image represented by image data which
   is obtained by imaging a subject continuously and
   is displayed on a screen of an imaging device;
   a detection area updating device, responsive to detection of the target by said target detecting device, for updating the detection area in such a manner that the detected target will occupy the center thereof;
   a motion detecting device, wherein said motion detecting device is responsive to the target no longer being detected by said target detecting device in one frame and the motion detecting device detects magnitude and direction of motion of the overall subject image in which the target is no longer detected, wherein said motion of the overall subject image in which the target is no longer detected represents a motion of the imaging device;
   a detection area setting device for setting the detection area in a following frame when the target is no longer being detected by said target detecting device in said one frame, wherein
      if the motion of the imaging device detected by said motion detecting device is equal to or greater than a prescribed magnitude, the imaging device is following the moving target, and the detection area setting device then sets the detection area at a central portion of the subject image in said following frame, and
      if the motion of the imaging device detected by said motion detecting device is less than the prescribed magnitude, the imaging device is not following the moving target, and the detection area setting device then sets the detection area, whose size differs from the size of the detection area set at the central portion, at an edge of the subject image in a direction opposite the direction of motion of the overall subject image which has been detected by said motion detecting device; and
   a control device for controlling said target detecting device, said detection area updating device, said motion detecting device and said detection area setting device so as to repeat processing for detecting the target, processing for updating the detection area, processing for detecting the magnitude and direction of the motion, and processing for setting the detection area.

2. The apparatus according to claim 1, wherein said detection area setting device moves the detection area at a position nearer the central portion of the subject image the larger the magnitude of motion of the overall subject image detected by said motion detecting device; and
   moves the detection area at a position nearer the edge of the subject image in the direction opposite the direction of motion of the overall subject image the smaller the magnitude of motion of the overall subject image detected by said motion detecting device.

3. The apparatus according to claim 1, wherein said motion detecting device detects the magnitude and direction of motion of the overall subject image based upon amount of deviation between two successive frames of subject images.

4. The apparatus according to claim 1, wherein said target detecting device assumes that a target has been detected owing to existence in the detection area of a portion having the feature of an image representing a target, or of an image portion identical with a template image representing the target.

5. A method of controlling operation of a target tracking apparatus, comprising the steps of:
   detecting a target, which is to be tracked, within a detection area of a subject image represented by image data which is obtained by imaging a subject continuously and is displayed on a screen of an imaging device;
   in response to detection of the target, updating the detection area in such a manner that the detected target will occupy the center thereof;
   in response to the target no longer being detected in one frame, detecting magnitude and direction of motion of the overall subject image in which the target is no longer detected, wherein said motion of the overall subject image in which the target is no longer detected represents a motion of the imaging device;
   setting the detection area in a following frame when the target is no longer being detected in said one frame, wherein
      if the motion of the imaging device detected is equal to or greater than a prescribed magnitude, the imaging device is following the moving target, and the setting step then sets the detection area at a central portion of the subject image in said following frame, and
      if the detected motion of the imaging device is less than the prescribed magnitude, the imaging device is not following the moving target, and the setting step then sets the detection area, whose size differs from the size of the detection area set at the central portion, at an edge of the subject image in a direction opposite the detected direction of motion of the overall subject image; and
   repeating processing for detecting the target, processing for updating the detection area, processing for detecting the magnitude and direction of the motion, and processing for setting the detection area.

6. A recording medium storing a computer-readable program for controlling a computer of a target tracking apparatus so as to:
   detect a target, which is to be tracked, within a detection area of a subject image represented by image data which is obtained by imaging a subject continuously using an imaging device;
   in response to detection of the target, update the detection area in such a manner that the detected target will occupy the center thereof;
   in response to the target no longer being detected in one frame, detect magnitude and direction of motion of the overall subject image in which the target is no longer detected, wherein said motion of the overall subject image in which the target is no longer detected represents a motion of the imaging device;
   set the detection area in a following frame when the target is no longer being detected in said one frame, wherein
      if the motion of the imaging device detected is equal to or greater than a prescribed magnitude, the imaging device is following the moving target, and the detection area is then set at a central portion of the subject image in said following frame, and
      if the detected motion of the imaging device is less than the prescribed magnitude, the imaging device is not following the moving target, and the detection area, whose size differs from the size of the detection area set at the central portion, is then set at an edge of the subject image in a direction opposite the detected direction of motion of the overall subject image; and
   repeat processing for detecting the target, processing for updating the detection area, processing for detecting the magnitude and direction of the motion, and processing for setting the detection area.

7. A digital camera comprising:
   an imaging device for continuously imaging a subject and successively outputting image data representing the image of the subject;
   a target detecting device for detecting a target, which is to be tracked, within a detection area of the subject image represented by the image data that has been output from said imaging device;
   a detection area updating device, responsive to detection of the target by said target detecting device, for updating the detection area in such a manner that the detected target will occupy the center thereof;
   a motion detecting device, wherein said motion detecting device is responsive to the target no longer being detected by said target detecting device in one frame, and the motion detecting device detects magnitude and direction of motion of said imaging device;
   a detection area setting device for setting the detection area in a following frame when the target is no longer being detected by said target detecting device in said one frame, wherein
      if the motion of said imaging device detected by said motion detecting device is equal to or greater than a prescribed magnitude, the imaging device is following the moving target, and the detection area setting device then sets the detection area at a central portion of the subject image, and
      if the motion of said imaging device detected by said motion detecting device is less than the prescribed magnitude, the imaging device is not following the moving target, and the detection area setting device then sets the detection area, whose size differs from the size of the detection area set at the central portion, at an edge of the subject image in a direction identical with the direction of motion of said imaging device, which has been detected by said motion detecting device; and
   a control device for controlling said imaging device, said target detecting device, said detection area updating device, said motion detecting device and said detection area setting device so as to repeat processing for imaging the subject, processing for detecting the target, processing for updating the detection area, processing for detecting the magnitude and direction of the motion, and processing for setting the detection area.

8. The apparatus according to claim 1, wherein the detection area is smaller than the subject image.

9. The apparatus according to claim 1, wherein the size of the detection area set at the edge is bigger than the size of the detection area set at the central portion.

10. The apparatus according to claim 9, wherein the detection area set at the edge extends fully from the upper side to the lower side of an imaging zone.

* * * * *